United States Patent
Lu et al.

(10) Patent No.: US 10,831,974 B2
(45) Date of Patent: Nov. 10, 2020

(54) CAPACITANCE EXTRACTION METHOD FOR SEMICONDUCTOR SADP METAL WIRES

(71) Applicant: International Business Machines Corporation, Armonk, NY (US)

(72) Inventors: Ning Lu, Essex Junction, VT (US); Calvin Bittner, Saint Albans, VT (US)

(73) Assignee: International Business Machines Corporation, Armonk, NY (US)

(*) Notice: Subject to any disclaimer, the term of this patent is extended or adjusted under 35 U.S.C. 154(b) by 44 days.

(21) Appl. No.: 16/130,693

(22) Filed: Sep. 13, 2018

(65) Prior Publication Data
US 2020/0089836 A1     Mar. 19, 2020

(51) Int. Cl.
*G06F 30/398*     (2020.01)
*G03F 1/70*     (2012.01)
*G06F 30/367*     (2020.01)
*G06F 30/394*     (2020.01)
*G06F 119/10*     (2020.01)

(52) U.S. Cl.
CPC .............. *G06F 30/398* (2020.01); *G03F 1/70* (2013.01); *G06F 30/367* (2020.01); *G06F 30/394* (2020.01); *G06F 2119/10* (2020.01)

(58) Field of Classification Search
USPC ....................................................... 716/115
See application file for complete search history.

(56) References Cited

U.S. PATENT DOCUMENTS

| 7,350,167 | B1 | 3/2008 | Lenahan |
| 7,865,851 | B2* | 1/2011 | Gurney ............... G06F 17/5036 |
| | | | 716/100 |
| 8,252,489 | B2 | 8/2012 | Su et al. |
| 8,448,120 | B2 | 5/2013 | Huang et al. |
| 8,510,690 | B2 | 8/2013 | Kauth et al. |
| 8,732,628 | B1 | 5/2014 | Wu et al. |
| 9,171,124 | B2 | 10/2015 | Buck et al. |
| 2015/0121317 | A1* | 4/2015 | Lee ........................... G03F 1/00 |
| | | | 716/52 |
| 2015/0324511 | A1 | 11/2015 | Nieuwoudt et al. |
| 2017/0147729 | A1 | 5/2017 | Svizhenko et al. |

* cited by examiner

*Primary Examiner* — Eric D Lee
(74) *Attorney, Agent, or Firm* — Scully, Scott, Murphy & Presser, P.C.; Steven Meyers, Esq.

(57) ABSTRACT

A system, method and computer program product for extracting integrated circuit on-chip parasitic capacitance in semiconductor structures including structures formed according to a Self-Aligned Double Patterning (SADP) semiconductor manufacturing process. A method of calculating the capacitance of a conductive signal wire in a SADP layer whose adjacent wires or groups of wires are floating (not connected to a circuit or net and not signal carrying). Further, there is provided a system running an iterative method for accurately and efficiently eliminating a group of floating metals by eliminating one floating metal wire per iteration while extracting its corresponding on-chip parasitic coupling capacitance effect. Further, system and methods calculate parasitic capacitance calculation for an "isolated" wire(s) or a "semi-isolated wire" resulting from employing a Self-Aligned Double Patterning (SADP) processing technique. The system and method provides a capacitance calculation and circuit simulation solution without involving use of and without computing a capacitance matrix.

20 Claims, 14 Drawing Sheets

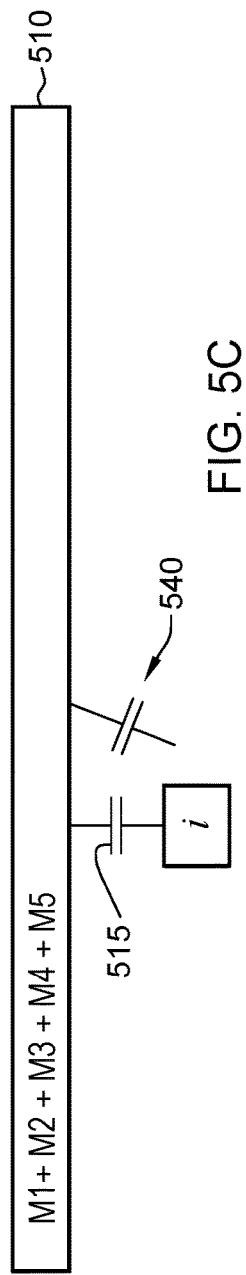
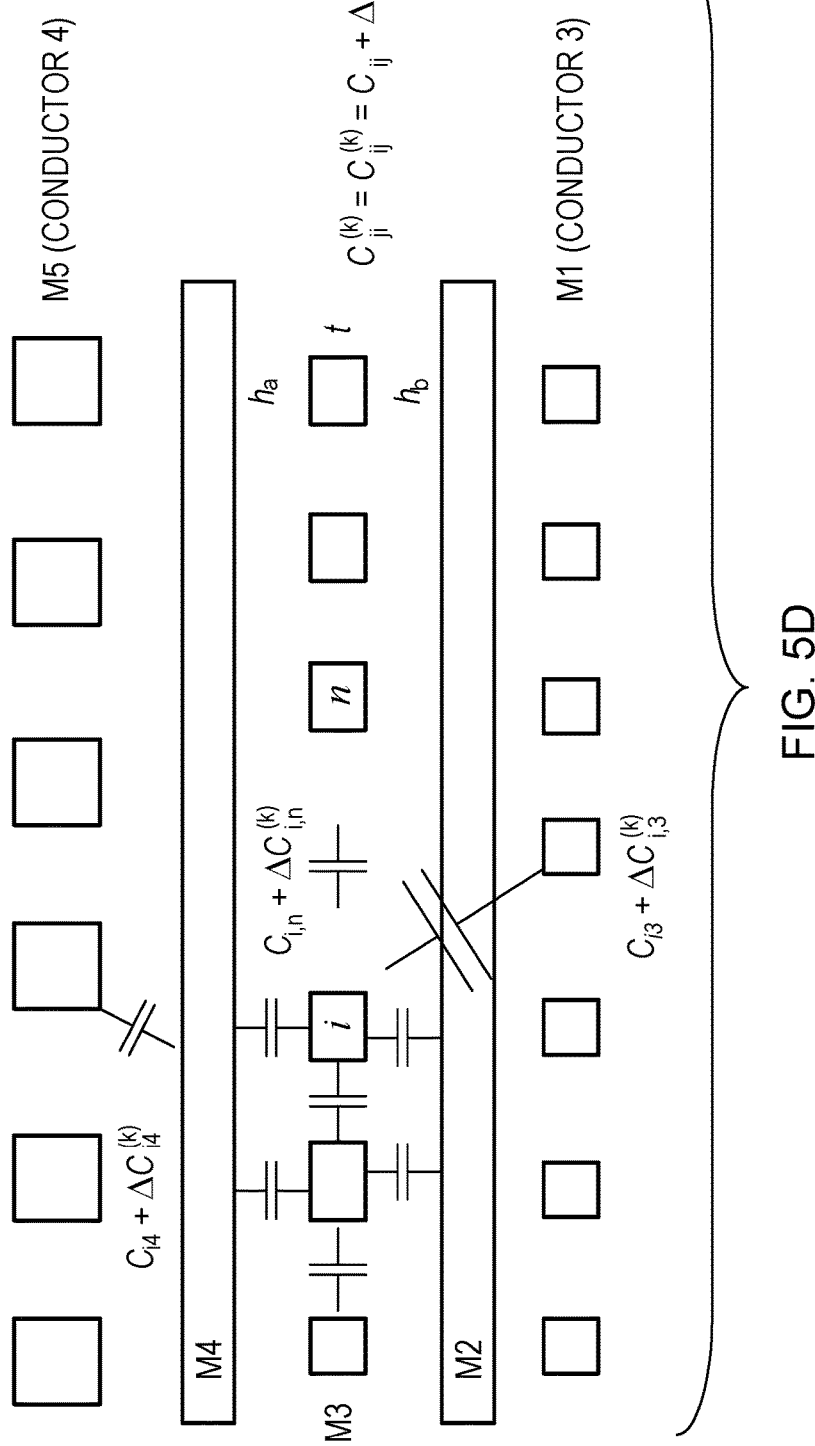
FIG. 5C
FIG. 5D

CAPACITANCE EXTRACTION METHOD FOR SEMICONDUCTOR SADP METAL WIRES

FIELD

The present invention generally relates to semiconductor design techniques, and particularly, a system and method for determining capacitance among a set of contacted metal wires when all other metal wires near them on a same metal level are floating.

BACKGROUND

In advanced semiconductor manufacturing processes, self-aligned double patterning (SADP) refers to the process of forming features and using spacers on the features in a technique for defining narrower features, e.g., at half an original lithographic pitch.

A process traditionally performed in the design of the IC is called Parasitic Extraction (PEX) which refers to the calculation of parasitic effects (e.g., parasitic capacitances, resistances and inductances) in the designed electronic components and the required wiring interconnects.

The purpose of the parasitic extraction is to create an accurate analog model of the circuit, such that detailed simulations can emulate actual digital and analog circuit responses. After parasitic extraction, integrated circuits are often simulated in details to determine whether the resistance and inductance in metal wires and the parasitic capacitance among metal wires may allow the designed IC to function within predetermined specifications.

Most PEX tools focus on metal fill shapes and propose various approximate methods to speed up capacitance extraction in the presence of floating metal fill, or have to solve a huge capacitance matrix equation to eliminate floating metal fill shapes accurately.

SUMMARY

A system, method and computer program product are provided to efficiently and accurately compute the capacitance among a set of contacted wires formed according to a Self-Aligned Double Patterning process (SADP) when all other wires next to them at the same metal level are floating.

A system and method for extracting integrated circuit on-chip parasitic coupling capacitance in semiconductor structures formed according to an SADP process forming SADP wires, e.g., in 10 nm, 7 nm or 5 nm nodes.

A system, method and computer program product are provided to efficiently and accurately compute the capacitance among a set of contacted wire having adjacent track wires present even when those adjacent track wires are not actually connected to any net (a floating wire), and provides a capacitance calculation and circuit simulation solution without involving use of and without computing a capacitance matrix.

Further, the system and methods herein calculating parasitic capacitance calculation for an "isolated" wire(s) or a "semi-isolated wire" resulting from employing a Self-Aligned Double Patterning (SADP) processing technique.

In one aspect, a computer-implemented method for manufacturing a multi-level integrated circuit (IC) is provided. The method comprises: accessing, using a computer system, a multi-level integrated circuit design layout; extracting, using the computing system, a parasitic capacitance of structures in the multi-level IC design layout, the structures including a wire level having a plurality of metal wires to be manufactured according to a self-aligned double-patterning (SADP) manufacturing process, the wire level situated above one or more lower layers of conductive structures and situated below one or more upper layers of conductive structures, the extracting resulting in a capacitive network of wires in the IC design layout; selecting a target metal wire from the plurality of metal wires at the wire level, the selected target metal wire having one or more parallel situated floating metal wires on at least one side thereof, the capacitive network comprising: capacitance component values for the target metal wire at the SADP metal wire layer, capacitance component values of the floating metal wires, a node of the selected target metal wire, and nodes of the floating metal wires; eliminating, using one or more processors of the computing system, the nodes of the floating metal wires from the capacitive network to reduce the size of the capacitive network; simulating, using a circuit simulator run at the computer system, a circuit performance involving the selected target metal wire of the capacitive network; repeating, at the computing system, from the IC design layout, cycles of parasitic capacitance extracting, capacitance-network size reducing, and the simulating to optimize the multi-level IC design layout.

In accordance with a further aspect of the invention, there is provided a computer program product for manufacturing a multi-level integrated circuit (IC). The computer program product comprises a non-transitory computer readable storage medium having program instructions embodied therewith, the program instructions executable by the computer to cause the computer to perform a method. The method comprises: analyzing, using a computer system, a multi-level integrated circuit design layout; extracting, using the computing system, a parasitic capacitance of structures in the multi-level IC design layout, the structures including a wire level having a plurality of metal wires to be manufactured according to a self-aligned double-patterning (SADP) manufacturing process, the wire level situated above one or more lower layers of conductive structures and situated below one or more upper layers of conductive structures, the extracting resulting in a capacitive network of wires in the IC design layout; selecting a target metal wire from the plurality of metal wires at the wire level, the selected target metal wire having one or more parallel situated floating metal wires on at least one side thereof, the capacitive network comprising: capacitance component values for the target metal wire at the SADP metal wire layer, capacitance component values of the floating metal wires, a node of the selected target metal wire, and nodes of the floating metal wires; eliminating, using one or more processors of the computing system, the nodes of the floating metal wires from the capacitive network to reduce the size of the capacitive network; simulating, using a circuit simulator run at the computer system, a circuit performance involving the selected target metal wire of the capacitive network; repeating, at the computing system, from the IC design layout, cycles of parasitic capacitance extracting, capacitance-network size reduction, and the simulating to optimize the multi-level IC design layout.

The present invention is advantageously employed in a computer system having one or more processor devices for running the parasitic capacitance extraction methods for semiconductor SADP metal wires.

BRIEF DESCRIPTION OF THE DRAWINGS

The objects, features and advantages of the present invention will become apparent to one skilled in the art, in view of the following detailed description taken in combination with the attached drawings, in which:

FIGS. 5A-5D illustratively depict a parasitic capacitance extraction method by eliminating one floating metal wire in one embodiment;

DETAILED DESCRIPTION

A system and method for extracting integrated circuit on-chip parasitic capacitance in semiconductor structures including metal wire structures formed according to a Self-Aligned Double Patterning (SADP) semiconductor manufacturing process. These metal wire structures are formed in, for example, 10 nm, 7 nm, 5 nm, etc. node technologies using an advanced SADP process. In one aspect, a method of calculating the capacitance of a conductive signal wire in a SADP layer whose adjacent wires are floating (not connected to a circuit or net and not signal carrying) and without solving a capacitance matrix equation. Such conductive wire structures designed according to an SADP process may include groups of floating metal wires adjacent a signal carrying line.

Further, there is provided a system running an iterative method for accurately and efficiently eliminating a group of floating metals from an original capacitive network by eliminating one floating metal wire per iteration while counting its corresponding on-chip parasitic coupling capacitance effect after eliminating the floating metal wire from the capacitive network.

In one embodiment, parasitic extraction (PEX) tools are provided that are programmed to receive inputs specifying one or more long floating metal wires that would result from employing a SADP process in semiconductor chip manufacture.

In one embodiment, performance of an integrated circuit (IC) is modeled by generating, from a design layout, a capacitance model for the signal-carrying wire structures of the IC formed according to the SADP process.

The signal-carrying wire structures capacitance model may then be used to generate wire-level netlists among all contacted wires.

Ultimately, an electronic circuit design simulator program such as Simulation Program with Integrated Circuit Emphasis ("SPICE") and the like (e.g., GNU Circuit Analysis Package (Gnucap) Ngspice, etc., may be run to perform electronic circuit simulations of the wire-level netlist. This may be implemented by taking a text netlist describing the circuit elements (wires, transistors, resistors, capacitors, etc.) and their connections, and translate this description into equations, e.g., nonlinear differential algebraic equations to be solved.

As a result of eliminating a group of floating metals, a netlist of reduced size is generated that includes effective coupling capacitance among contacted wires. In one embodiment, the methods perform a linking of capacitance calculations into a netlist specification.

In particular, the system and methods herein provides of linking on-chip parasitic coupling capacitance for contacted SADP wires into a netlist specification in a physically realistic manner after eliminating floating SADP wires.

Figure 1:
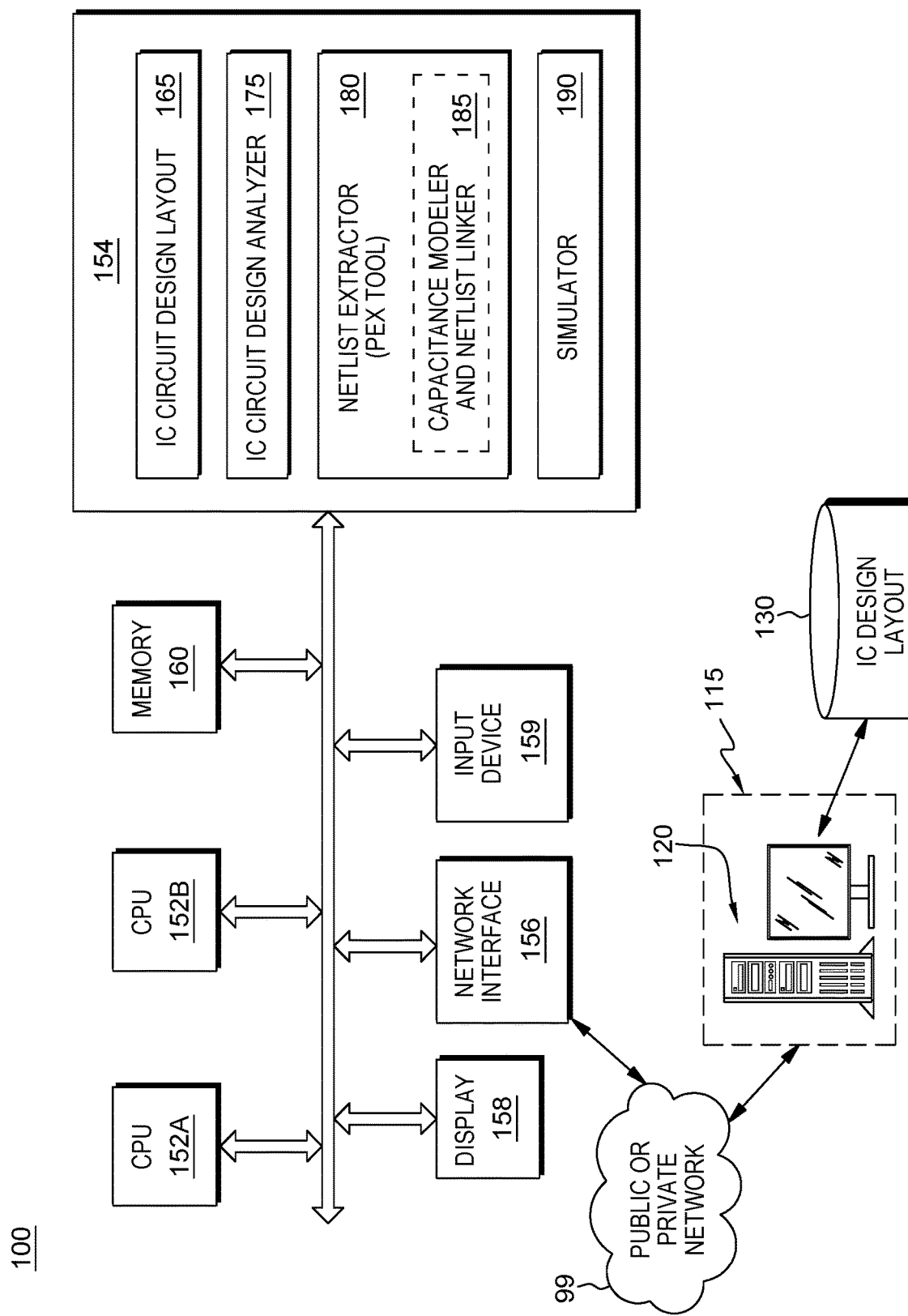
FIG. 1 shows a schematic diagram illustrating an integrated circuit performance modeling system running parasitic capacitance extraction methods for metal wires in one embodiment.

FIG. 1 shows a schematic diagram illustrating a computer system 100 running parasitic capacitance extraction methods for SADP wires (for both contacted wires and floating wires) in one embodiment. The system 100 is programmed with one or more software programs and/or incorporates special purpose hardware components so that it comprises a special purpose computer system for capacitance extraction and integrated circuit performance modeling.

Computing system 100 includes one or more hardware processors 152A, 152B, a memory 154, e.g., for storing an operating system and program instructions, a network interface 156, a display device 158, an input device 159, and any other features common to a computing device. In some aspects, computing system 100 may, for example, be any computing device that is configured to communicate with a web-site 115 or web- or cloud-based server 120 over a public or private communications network 99. Further, as shown as part of system 100, IC circuit design layouts that includes structures designed to be manufactured according to SADP semiconductor processing techniques may stored locally in an attached memory storage device 160, e.g., a clipboard memory, or stored in an attached, or a remote memory storage device 130, e.g., a database, and accessed via a remote network connection for input to the system 100.

In the embodiment depicted in FIG. 1, processors 152A, 152B may include, for example, a microcontroller, Field Programmable Gate Array (FPGA), or any other processor that is configured to perform various operations. Processors 152A, 152B may be configured to execute instructions as described below. These instructions may be stored, for example, as programmed modules in memory storage device 154.

Memory 154 may include, for example, non-transitory computer readable media in the form of volatile memory, such as random-access memory (RAM) and/or cache memory or others. Memory 154 may include, for example, other removable/non-removable, volatile/non-volatile storage media. By way of non-limiting examples only, memory 154 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to the ability of computer system 100 for performing automated parasitic capacitance extraction, the memory 160 may be configured for storing a technology file associated with the circuit design layout and may include a vertical layout of the IC design including dimensions and parameters, e.g., dielectric constants associated with the inter-level dielectric and other information. This memory 160 may be local to the computer or mobile device system 100, or otherwise, embodied as a database 130 associated with the remote server 120, over a network.

Computer system 100 is further equipped with a memory 154 storing processing modules that include programmed instructions adapted to invoke operations for analyzing a received circuit design layout 165. Such an integrated circuit design layout input to the system 100 may include a three-dimensional disposition of a multi-layer wiring elements including a sea of SADP connected and floating wires of an integrated circuit and any interconnections between various circuit elements of the integrated circuit.

In one embodiment, one of the programmed processing modules stored at the associated server memory 154 include an IC circuit design analyzer module 175 that when run, e.g., by a processor at system 100, configures the system to invoke operations for analyzing the circuit design including programmed instructions adapted to invoke operations for identifying a specific feature(s) such as signal carrying wires vs. floating wires designed to be produced according to SADP process.

In one embodiment, one of the programmed processing modules stored at the memory 154 include a Parasitic Extraction (PEX) tool 180 that, when run by a processor at system 100, configures the system to translate the integrated circuit design layout into an electrical circuit (netlist) representation. The PEX tool 180 may include a capacitance model library and invoke operations of a capacitance modeler employing instructions for modeling and extracting parasitic capacitance for identified structures in the layout and, including a linker component for linking extracted capacitance values, e.g., adding various parasitic capacitance elements within and between active and passive devices to the generated netlist representation of the circuit design.

Further, one of the programmed processing modules stored at the memory 154 may include an IC circuit design simulator 190 such as a Simulation Program with Integrated Circuit Emphasis (SPICE) simulator.

As will be appreciated by one skilled in the art, such components (i.e., the integrated circuit design layout analyzer 175, the netlist extractor 180 and the capacitance modeler 185, and the simulator 190) may be implemented entirely in hardware, entirely in software (including firmware, resident software, micro-code, etc., which is stored in the memory(ies) 154 and which is executable by the processor(s) to perform integrated circuit modeling,) or in a combination of software and hardware.

Figure 2:
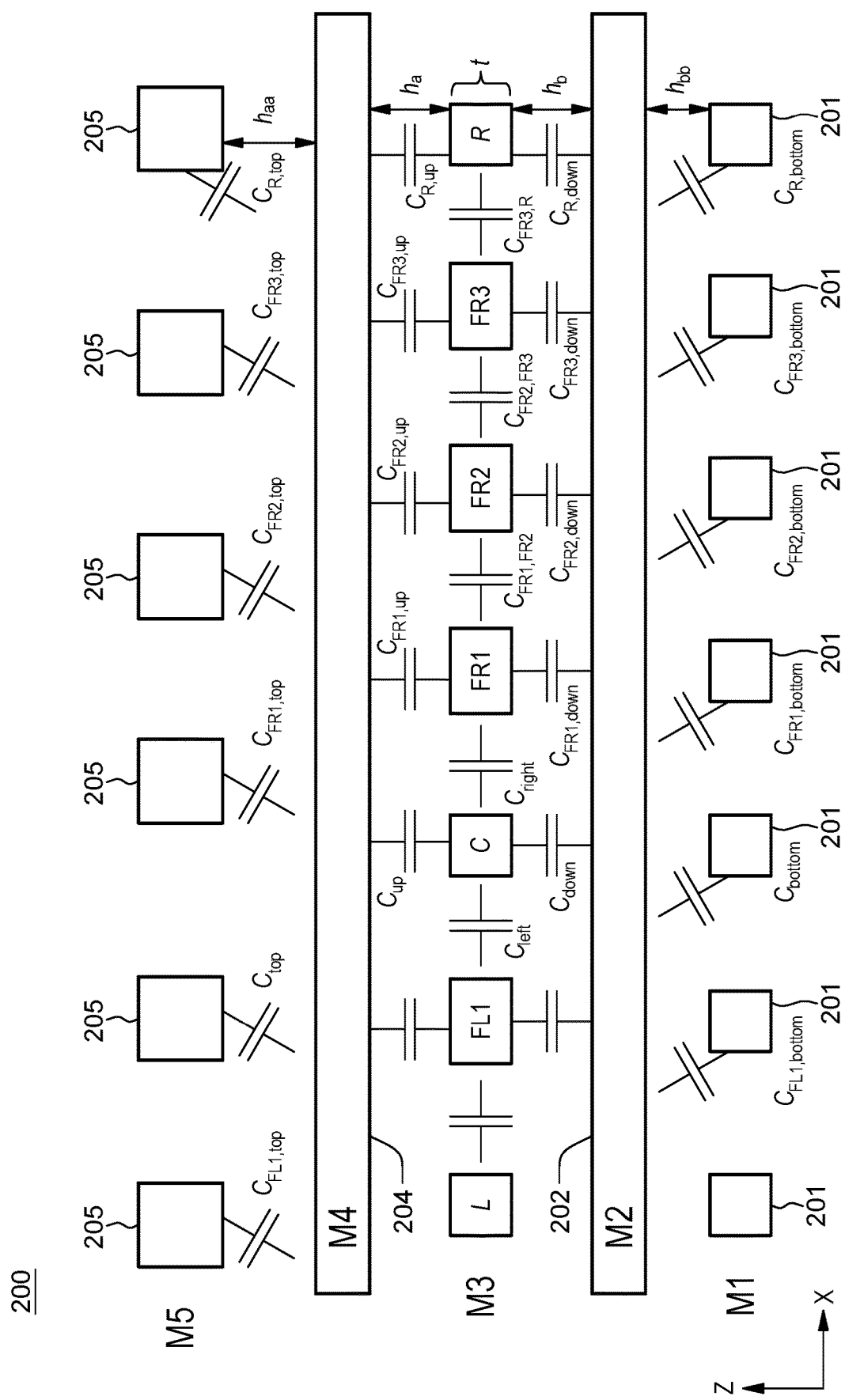
FIG. 2 shows a cross sectional view of an example multi-layer integrated circuit design 200 showing multiple layers of metal wires at an X-Z plane.

FIG. 2 shows a cross-sectional view of an example multi-layer integrated circuit design 200 showing multiple layers of metal wires shown at an X-Z plane. As five metal wire layers or levels M1, M2, M3, M4, M5 are shown in the example design, the design 200 may encompass more or less metal levels/lines. In the example circuit design 200 shown in FIG. 2, wires at the M3 level are patterned using an SADP process and include a "sea" of not used or connected (i.e., "floating" wires) that are still patterned and are to remain in the IC chip after manufacturing. Other metal layers M1, M2, M4 and M5 may be patterned according to either conventional or SADP semiconductor integrated circuit manufacturing techniques.

While embodiments herein are described with respect to multi-level metal layer SADP designs such as shown in FIG. 2, it is understood that the one or more metal layers above or below a subject layer having SADP wires are optional. Furthermore, one or more metal layers may be or include any type of conductive structure, e.g, a conductive plane or sheet.

At layer M3, between the central wire "C" and the closest contacted wire "R" on the right-hand side, there are three (3) floating wires labeled FR1, FR2, FR3 in between. Between the central wire C and the closest contacted wire "L" structure on the left-hand side, there is one floating wire structure FL1 shown in between.

In the methods herein, there are defined for the multi-layer integrated circuit design 200 include the following capacitance parameters:

$c_{top}$ representing a capacitance between the connected wire C at M3 layer to the collection of wires 205 at M5 metal level;

$c_{up}$ representing capacitance between the connected wire C at M3 layer and the collection of wires 204 at M4 metal level;

$c_{right}$ representing a capacitance between the connected M3 metal level wire C and its adjacent wire "R" (either contacted or floating) to its right at M3 layer;

$c_{left}$ representing a capacitance between the connected M3 metal level wire C and its adjacent wire "L" (either contacted or floating) to its left at M3 layer;

$c_{down}$ representing a capacitance between the connected M3 metal level wire C and the collection of wires 202 below it at the M2 layer;

$c_{bottom}$ representing a capacitance between the connected wire C at M3 layer and the collection of wires 201 further below it at the M1 layer.

Figure 3:
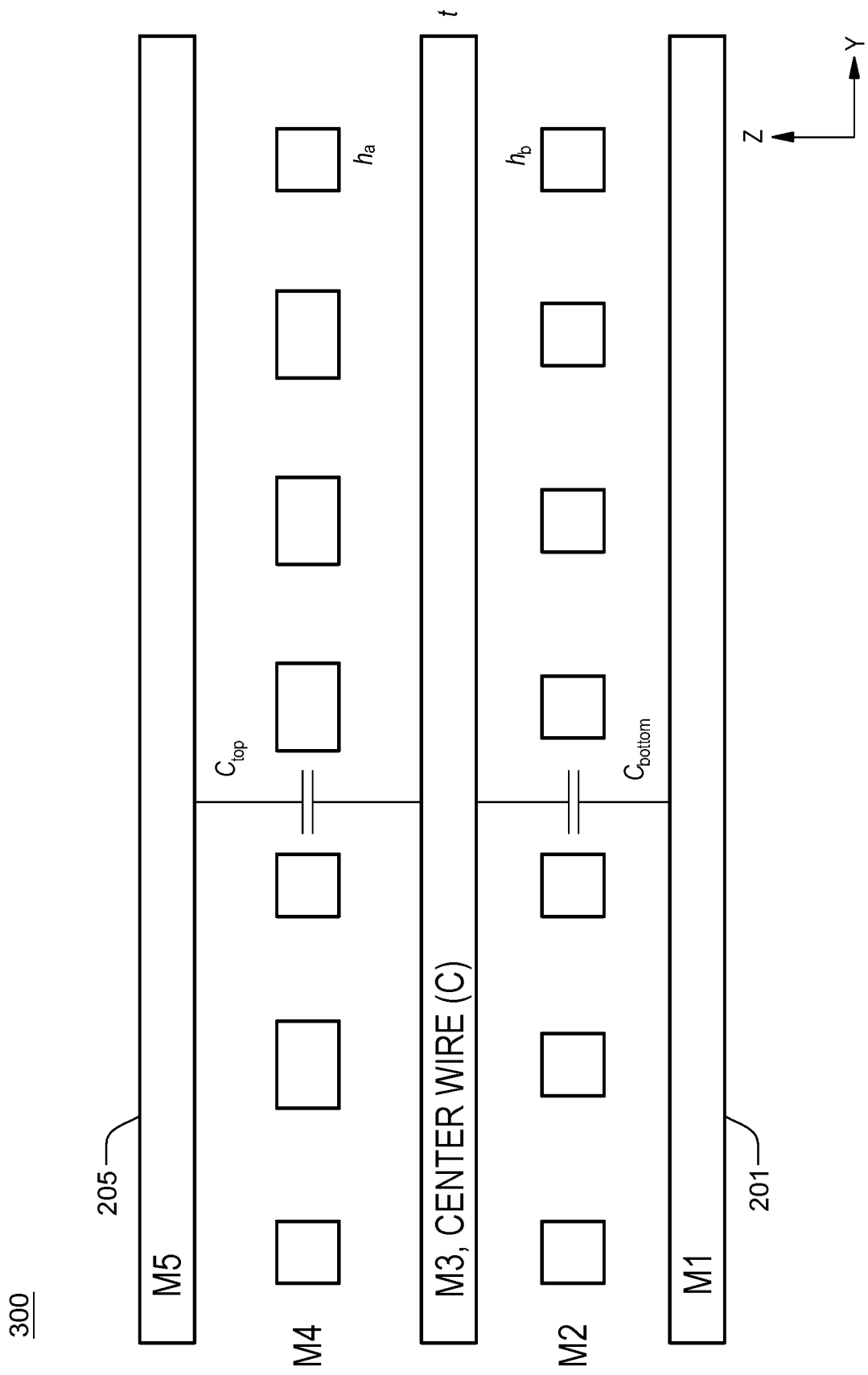
FIG. 3 shows a cross sectional view of a multi-layer integrated circuit design corresponding to the circuit design of FIG. 2 showing the multiple metal wire layers at the Y-Z plane.

For use in the methods herein, and shown in the multi-layer integrated circuit design 200 of FIG. 2 are the following distance parameters:

a distance $h_a$ representing the height of the inter-level dielectric (ILD) between the bottom surface of an M4 layer wire 204 and the top surface of the connected wire C below it at the M3 layer;

a distance $h_b$ (another ILD) representing the height of the dielectric between the bottom of the connected M3 layer wire C and the top surface of the M2 layer wire 202;

a distance $h_{aa}$ representing the height of the inter-level dielectric material between a top surface of a wire 204 at M4 level and a bottom surface of a wire above it at the M5 layer; and a distance $h_{bb}$ representing the height of the dielectric between the bottom surface of a wire 202 at M2 level and a top surface of a wire below it at the M1 layer;

FIG. 3 depicts a further cross-sectional view of a multi-layer integrated circuit design 300 corresponding to the circuit design 200 of FIG. 2 showing the multiple (five) metal wire layers M1, M2, M3, M4, M5 in a Y-Z plane. As mentioned, in the circuit design 300 shown in FIG. 3, wires at M3 level are patterned using an SADP process and include a sea of not used or connected (i.e., "floating" wires) wires that have been patterned and remain in the IC after manufacturing.

FIG. 3 more clearly shows the $c_{top}$ capacitance parameter representing the capacitance between the collection of metal wires 205 at M5 level and the contacted metal wire C at the M3 layer, and $c_{bottom}$ representing the capacitance between the contacted metal wire C at the M3 level and the collection of metal wires 201 at M1 level.

Figure 4:
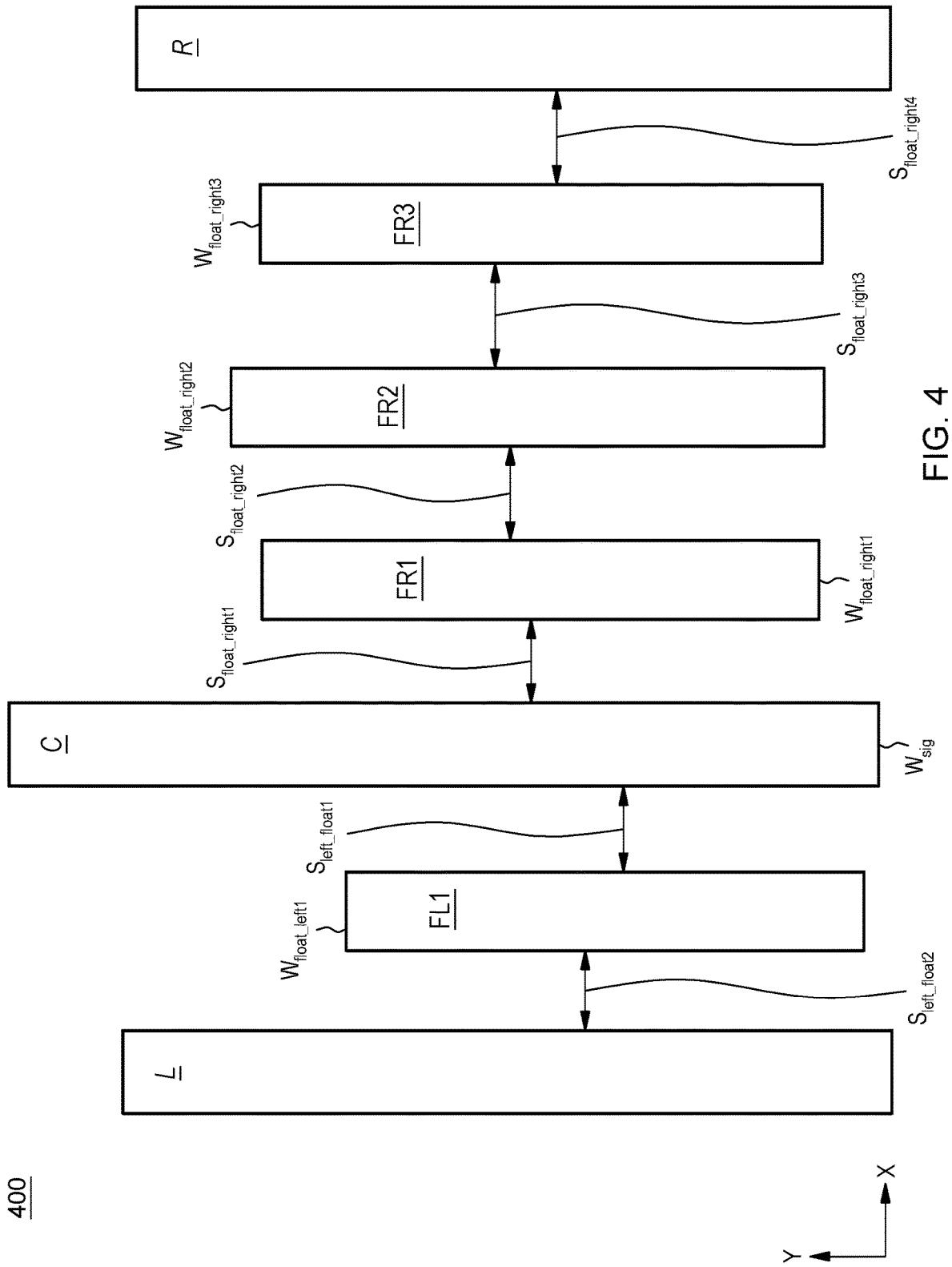
FIG. 4 depicts a layout view of the multi-layer integrated circuit design of FIG. 2 showing the multiple SADP metal wires at a M3 metal level taken along the X-Y plane.

FIG. 4 depicts a circuit layout view 400 of the multi-layer integrated circuit design 200 of FIG. 2 showing the multiple metal wires at the M3 level taken along the X-Y plane.

As shown in FIG. 4, the layout view 400 depicts at layer M3, the contacted or signal carrying wire (a wire connected to a circuit or net) represented as the central wire C, the closest contacted wire R structure (i.e., connected to a circuit or net) on the right-hand side, and three floating wires (i.e., not contacted to any net) including first floating wire FR1, second floating wire FR2, and third floating wire FR3 in between. Between the signal carrying wire C and the closest contacted wire L on the left-hand side, there is one floating wire structure FL1 shown in between.

As used in the methodology described herein, shown in the layout view of multi-layer integrated circuit design 400 of FIG. 4 are the following floating wire related model instance parameters:

$N_{float\_left}$, representing the number of floating wires between a conductive signal carrying wire C and its nearest contacted wire "L" on the left-hand side ($N_{float\_left}$=1 in FIG. 4);

$N_{float\_right}$, representing the number of floating wires between the signal carrying wire C and its nearest contacted wire "R" on the right-hand side ($N_{float\_right}$=3 in FIG. 4);

a distance $s_{left\_float1}$, representing a distance or space between the contacted wire C and a first floating wire FL1 on the left-hand side;

a distance $s_{left\_float2}$, representing a distance or space between the first floating wire FL1 on the left and the contacted wire L;

a distance $s_{float\_right1}$, representing a distance or space between the signal carrying wire C and the first floating wire FR1 to its right-hand side;

a distance $s_{float\_right2}$, representing a distance or space between the first floating wire FR1 on the right-hand side to the second floating wire FR2 on the right-hand side;

a distance $s_{float\_right3}$, representing a distance or space between the second floating wire FR2 on the right-hand side to the third floating wire FR3 on the right-hand side;

a distance $s_{float\_right4}$ representing a distance or space between the third floating wire FR3 on the right-hand side to the right-hand side contacted wire R;

a width $w_{sig}$ of the first signal carrying wire C (in a SADP level);

a width $w_{float\_left1}$ of the first floating wire FL1 on the left-hand side;

a width $w_{float\_right1}$ of the first floating wire FR1 on the right-hand side;

a width $w_{float\_right2}$ of the second first floating wire FR2 on the right-hand side; and a width $w_{float\_right3}$ of the third floating wire FR3 on the right-hand side.

Figure 6A:
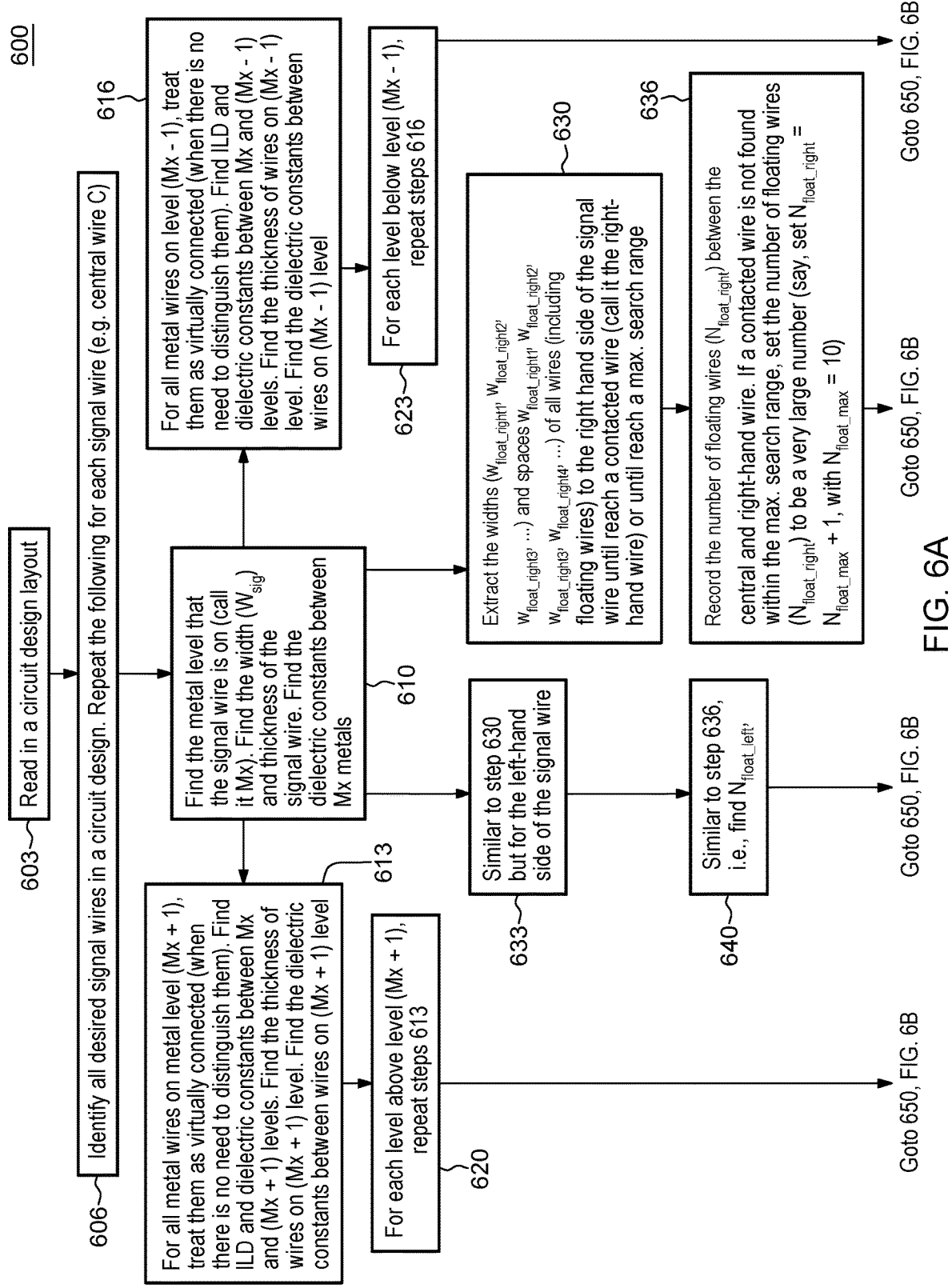
FIGS. 6A-6B depict a method of determining a capacitance of a connected wire line in a circuit having multiple wires at multiple levels, wherein some of the multiple wires are floating metal wires in a SADP layer.
Figure 6B:
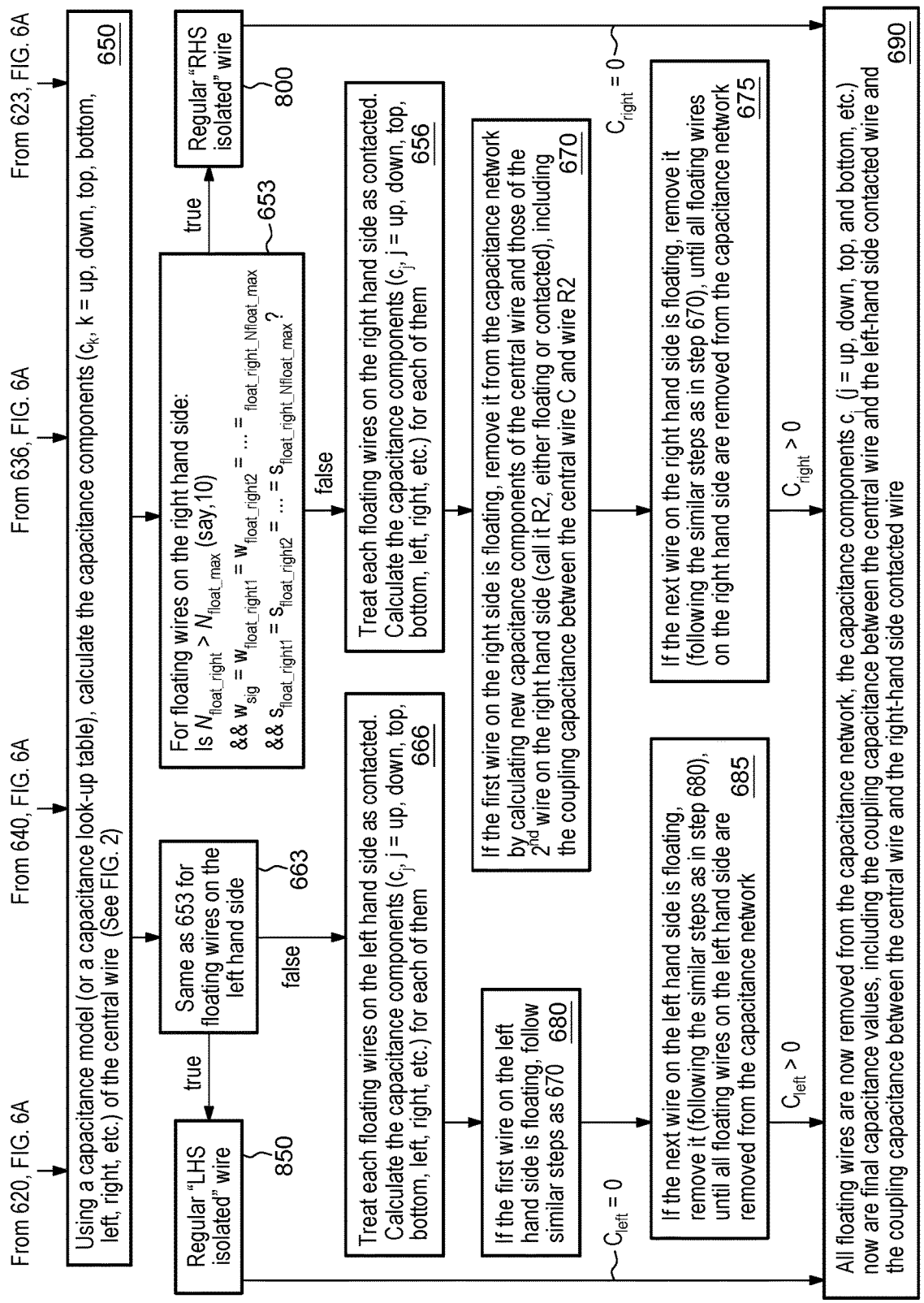

Referring to FIGS. 6A-6B, there is depicted a method of determining a capacitance of a connected wire line in a circuit having multiple wires at multiple levels, wherein some of the multiple wires are floating or dummy wires and are designed according to a self-aligned double patterning (SADP) semiconductor manufacturing process.

At 603, FIG. 6A, a first step includes reading in a circuit design layout into the parasitic extractor (PEX) tool 180 running at the computer system of FIG. 1. The circuit design layout may include a description or specification of physical electronic components and how they are connected together. For example, such connectivity of the electronic circuit may include wires, device (active and passive) components and perhaps some attributes of the components involved. Alternatively, the circuit may be read in according to a hardware description language. For purposes of illustration, a netlist corresponding to the circuitry depicted in FIG. 4, is first being generated and then being reduced according to the methods herein.

Continuing to 606, FIG. 6A, the circuit analyzer module 175 is run for identifying from the input circuit descriptions all the desired signal wires in a circuit design. The method then may focus on one wire at a time, e.g., the central connected wire C at the M3 level in the embodiments described herein. The following method steps are then repeated for each signal wire identified.

At 610, the method finds the metal level that the signal wire is on (e.g., level Mx) and determines the width ($w_{sig}$) and thickness (t) of the signal wire. The thickness (t in FIG. 2) of the conductive wires may be obtained from a technology file associated with the design. The technology file includes the vertical dimensions of various layers in semiconductor manufacturing. The technology file also contains dielectric constants associated with the inter-level dielectric materials between metal wires in a same metal level, the dielectric constants of materials between Mx metals level and (Mx+1) metal level above it, and the dielectric constants of materials between Mx metal level and (Mx−1) metal level below it.

Then, the method follows two processing paths beginning at steps 613 and 616 as shown in FIG. 6A. These paths may be performed in parallel or, alternatively, in succession, for each signal wire found. For purposes of description, the method steps are applied for the subject central contacted wire C of the circuit design of FIGS. 2-4.

In a first path, at 613, there are computer-implemented steps that define all metal wires on metal level (Mx+1) above the signal carrying wire at Mx as being virtually connected (e.g., when there is no need to distinguish them). In the example multi-layer circuit design described herein, this would be for metal level M4. Then the method determines the ILD and dielectric constants between Mx and (Mx+1) levels. Then the method further determines the thickness of wires on (Mx+1) level and finds the dielectric constants between wires on (Mx+1) level from the technology file used by the PEX extraction tool.

The process will then proceed to step 620, FIG. 6A where the steps performed at 613 are repeated for each metal level above (Mx+1) wire level. For the example multi-layer circuit design described herein, this would be for metal level M5. Once 620 is repeated for each level above the (Mx+1) wire level, the process proceeds to step 650, FIG. 6B.

Returning to step 610, FIG. 6A, further steps are performed in parallel or in succession to steps 613 and 620. That is, after finding the metal level (Mx) that the signal wire is on, a second path processing is performed at 616, where all metal wires on metal level (Mx−1) are treated as being virtually connected (e.g., when there is no need to distinguish them). In the example multi-layer circuit design described herein, this would correspond to metal level M2. Then the method at 616 determines the ILD and dielectric constants between Mx and (Mx−1) levels and further determines the thickness of wires on (Mx−1) level and finds the dielectric constants between wires on (Mx−1) level from the technology file used by the PEX extraction tool.

The process will then proceed to step 623, FIG. 6A where the steps indicated at 616 are repeated for each level below (Mx−1) wire level. For the example multi-layer circuit design described herein, this would correspond to metal level M1. Once 623 is repeated for each level below the (Mx−1) wire level, the process proceeds to step 650, FIG. 6B.

Returning to step 610, further steps are performed in parallel or in succession to steps 613, 616, 620 and 623. At step 630, FIG. 6A, computer-implemented steps perform extracting geometry information from the design layout, e.g., the widths (e.g., $w_{float\_right1}$, $w_{float\_right2}$, $w_{float\_right3}$, ... ) and spaces (e.g., $s_{float\_right1}$, $s_{float\_right2}$, $s_{float\_right3}$, $s_{float\_right4}$, ... ) of all wires (including floating wires) to the right-hand side of the signal wire C at layer Mx until a contacted wire R (call it "right-hand wire") is reached (see FIG. 4), or until a maximum search range is reached. In the embodiment described herein, floating wire width parameters $w_{float\_right1}$, $w_{float\_right2}$, $w_{float\_right3}$ and spaces $s_{float\_right1}$, $s_{float\_right2}$, $s_{float\_right3}$, $s_{float\_right4}$ would be extracted.

Continuing to 636, FIG. 6A, computer-implemented steps are run for recording the number of floating wires ($N_{float\_right}$) between the central wire and the right-hand wire. If a contacted wire is not found within the maximum search range, set the number of floating wires ($N_{float\_right}$) to be a very large number (say, set $N_{float\_right}=N_{float\_max}+1$, with $N_{float\_max}=10$). In the embodiment depicted with respect to FIG. 4, $N_{float\_right}=3$.

Similarly, at 633, FIG. 6A, computer-implemented steps perform extracting the widths ($w_{float\_left1}$, $w_{float\_left2}$, $w_{float\_left3}$, ... ) and spaces ($s_{float\_left1}$, $s_{float\_left2}$, $s_{float\_left3}$, $s_{float\_left4}$, ... ) of all wires (including floating wires) to the left-hand side of the signal wire Mx until a contacted wire L (call it "left-hand wire") is reached (see FIG. 4), or until a maximum search range is reached. In the embodiment described herein, floating wire width $w_{float\_left1}$ and spaces $s_{float\_left1}$, $s_{float\_left2}$ would be extracted.

Continuing to 640, FIG. 6A, computer-implemented steps are run for recording the number of floating wires parameter ($N_{float\_left}$) between the central wire and the left-hand wire. If a contacted wire is not found within the maximum search range, the method sets the number of floating wires ($N_{float\_left}$) to be a very large number (say, set $N_{float\_left}=N_{float\_max}+1$, with $N_{float\_max}=10$). In the example depicted with respect to FIG. 4, parameter $N_{float\_left}=1$.

Continuing from steps 620, 623, 636, and 640 the process proceeds to step 650, FIG. 6B where the capacitance modeler 185 (or capacitance look-up table) is used for extracting capacitive component parameters. In the embodiments implemented herein, six (6) capacitive components $c_k$ (k=up, down, top, bottom, left, and right) are computed for the signal wire C at level M3 as shown in the cross-section example of FIG. 2.

Continuing to 653, FIG. 6B, a series of processing steps run at the capacitance modeler of the PEX tool of FIG. 1 are run for the floating wires on the right-hand side, e.g., FR1, FR2, FR3. For example, a first step is performed to determine whether all 3 conditions are satisfied: (i) the $N_{float\_right} > N_{float\_max}$ (a threshold number of floating wires, e.g., $N_{float\_max}=10$); (ii) whether $w_{sig}=w_{float\_right1}=w_{float\_right2}= \cdots =w_{float\_right\_Nfloat\_max}$, and (iii) whether $s_{float\_right1}=s_{float\_right2}= \cdots = s_{float\_right\_Nfloat\_max}$, i.e., the same floating wire thicknesses and same space pattern. If all three conditions are met, or resolves to be true, then the process continues at 800 to compute regular "RHS isolated" wire capacitance parameters as will be further described herein below with respect to FIG. 8. Otherwise, if any of the three conditions is not met, then the process proceeds to 656, FIG. 6B.

At step 656, computer-implemented steps treat each floating wire on the right-hand side as contacted (i.e., connected to a circuit or net and is signal carrying). Then, using the capacitance modeler module or capacitance look-up table, the method computes the set of six capacitance components $c_j$ (j=up, down, bottom, top, left, right) for each of the floating wires, e.g., FR1, FR2, FR3 in the example.

Continuing to 670, FIG. 6B, the method determines whether the first wire on the right-hand side is floating, and if it is floating, then the method removes it from the capacitance network by calculating new capacitance components of the central wire and those of the 2nd wire on the right-hand side (either floating or contacted; call it "R2"), including the coupling capacitance between the central wire C and wire R2.

FIGS. 5A-5D illustratively depict a parasitic capacitance extraction method 500 performed at step 670 in FIG. 6B for signal carrying wires formed by an SADP process in a multi-level patterned IC design. The parasitic capacitance extraction method 500 is iterative and carries out rounds of steps for eliminating a floating wire between signal carrying wires in each round. As a result, these eliminated floating wires are removed from the corresponding netlist description for the integrated circuit design. FIGS. 5A-5D illustratively depicts one round of steps for eliminating one floating wire.

Figure 5A:
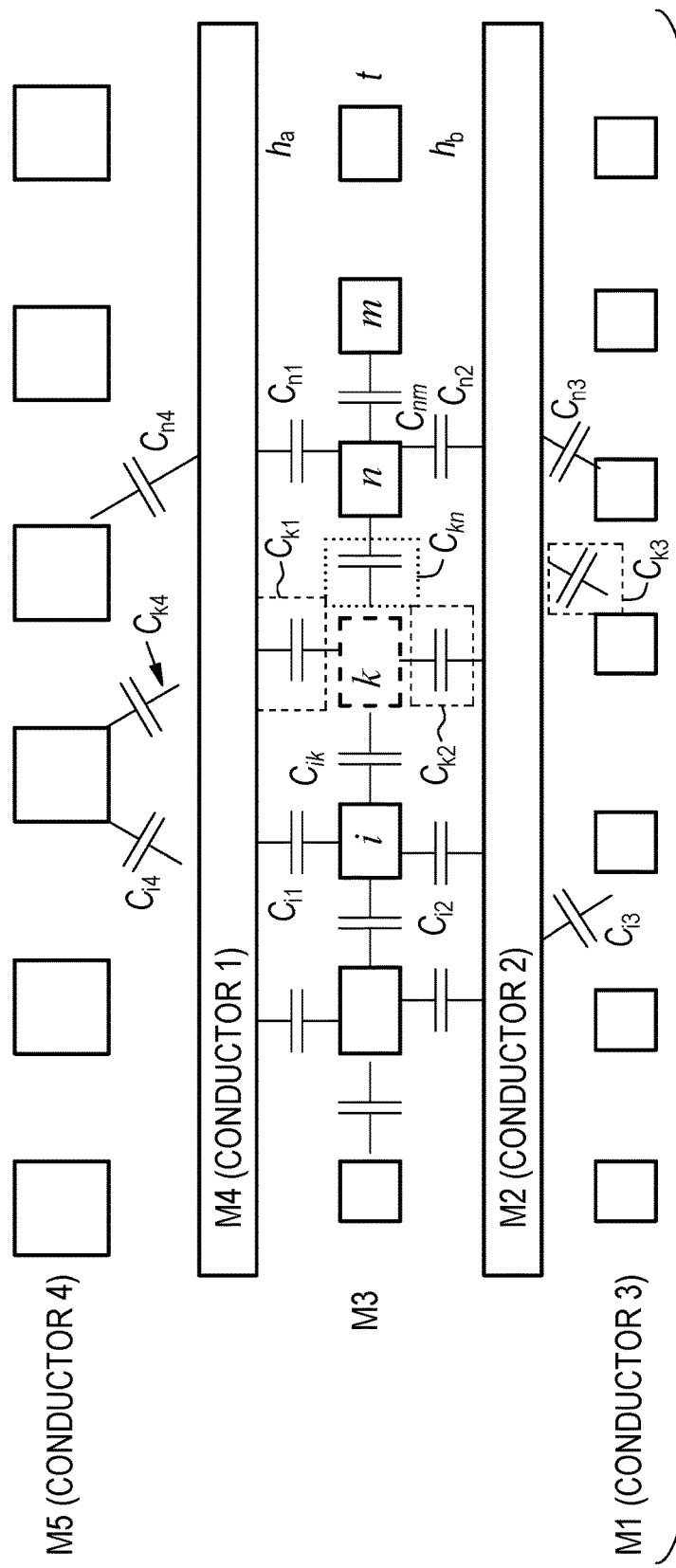

For purposes of illustrating one round of steps for parasitic capacitive extraction, FIG. 5A depicts a cross-sectional view of a multi-layer integrated circuit design 500. The multi-layer integrated circuit design 500 shown in FIG. 5A corresponds to the IC circuit design 200 of FIG. 2 and shows the metal level M3 having the signal carrying contacted wire conductor as the $i^{th}$ conductor and an adjacent right-hand side floating wire to be eliminated in the current round as the $k^{th}$ conductor.

As shown in FIG. 5A, there are N coupled conductors (including one or more floating metal wires at M3 level) forming a capacitive network. They are labeled as the first, second, ..., $i^{th}$, ..., $k^{th}$, ..., and $N^{th}$ conductor. If one is interested in all capacitance components of only one wire, N is relative small number. For the wire C in FIG. 2, N can be 11: Seven wires at M3 metal level, all wires in M1 level, all wires in M2 level, all wires in M4 level, and all wires in M5 level. The capacitance between the $i^{th}$ conductor and the $j^{th}$ conductor is denoted as $c_{ij}$ (i, j=1, 2, ..., N, i≠j) with $c_{ij}=c_{ji}$. N(N-1)/2 capacitive elements $c_{ij}$ form a capacitance network. The method performs eliminating the $k^{th}$ conductor (which is one of floating wires) from the network in this iteration.

As shown in FIG. 5A, a $k^{th}$ conductor corresponding to a floating wire formed by the SADP process is to be eliminated from the capacitance network of N conductors. Returning to step 656, FIG. 6, a floating wire "k" is treated as a contacted conductor (e.g., a signal carrying or circuit ground wire), and being the nearest adjacent floating wire on the right-hand side of the signal carrying wire "i", i.e., the floating wire "k" in FIG. 5A is the floating wire FR1 at metal level M3 as depicted in FIG. 2. In each round, a floating wire among the original N conductors is eliminated (from the netlist) and a corresponding change (e.g., increase) in the capacitance of each remaining conductor due to the elimination of the floating wire "k" is computed. FIG. 5A shows the eliminating of a $k^{th}$ conductor between the signal carrying wire i and the right hand most conductor R. In one embodiment, the process of eliminating the $k^{th}$ conductor includes first computing the six capacitive parameters for the $k^{th}$ conductor to be eliminated using the parameter values from a technology file such as wire thicknesses, spaces, ILD dielectric materials, etc. These are highlighted in FIG. 5A as these capacitance components: $c_{k1}$ is the "up" capacitance component between the $k^{th}$ conductor and the collection of metal wires at M4, $c_{k2}$ is the "down" capacitance component between the $k^{th}$ conductor and the collection of metal wires at M2, $c_{k3}$ is the "bottom" capacitance component between the $k^{th}$ conductor and the collection of metal wires at M1, $c_{k4}$ is the top capacitance component between the $k^{th}$ conductor and the collection of metal wires at M5, $c_{ik}$ is the "left" capacitance component between the $k^{th}$ conductor and the subject signal carrying conductor i (=conductor C in FIGS. 2-4) and $c_{kn}$ is the "right" capacitance component between the $k^{th}$ conductor and the next floating wire n on its right-hand side.

Figure 5B:
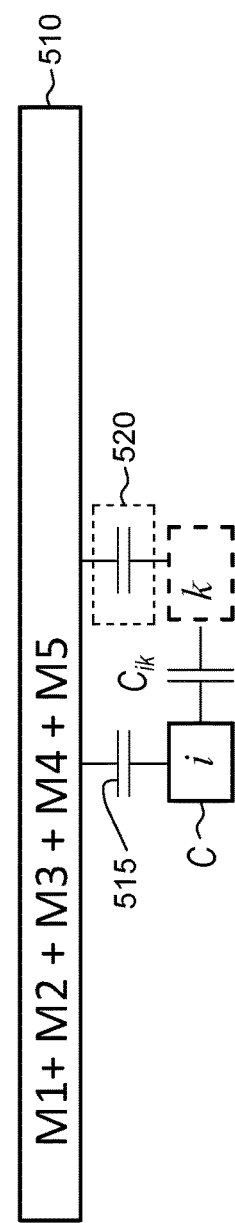

FIG. 5B shows, at the current sub-round of the capacitance network reduction for the $i^{th}$ conductor, the treating of all other (N-2) conductors (excluding the $i^{th}$ and $k^{th}$ conductors) as virtually connected to form a "large" conductor 510. In one embodiment, the (N-2) conductors are treated as if they are all connected in parallel. As shown in FIG. 5B, the method first form three (3) conductors: the $i^{th}$ conductor under consideration, the $k^{th}$ floating conductor to be eliminated, and the collection of the rest (N-2) conductors lumped together temporarily. As a result of running the steps depicted in FIG. 5B, the method simplifies the original large capacitance network containing N(N-1)/2 capacitive elements to only 3 coupling capacitance components: $c_{ik}$ is the original the capacitance between the $i^{th}$ conductor and the $k^{th}$ conductor, $c_{i,510}$ is the capacitance 515 between the $i^{th}$ conductor and the large conductor 510, a capacitance $C_{k,\,tot,\,not\_t\_th}$ is the capacitance 520 between the $k^{th}$ conductor (to be eliminated) and the large conductor 510. Notice that $C_{k,tot,not\_th}$ is the total capacitance of the $k^{th}$ conductor minus the capacitance $c_{ik}$, $$C_{k,tot,not\_i\_th} = \sum_{j=1, j \neq k, j \neq i}^{N} c_{jk} = C_{k,tot} - c_{ik} \quad (1)$$

In the method, $C_{k,tot}$ is the total capacitance of the $k^{th}$ conductor and is computed according to:

$$C_{k,tot} = \sum_{j=1, j \neq k}^{N} c_{jk}, k = 1, 2, \ldots, N \quad (2)$$

In FIG. 5B, there is thus modeled a series capacitance connection at the $k^{th}$ conductor, i.e., $c_{ik}$ and $C_{k,tot,not\_i\_th}$. Two capacitive elements $c_{ik}$ and $C_{k,tot,not\_i\_th}$ are connected in series. They can be replaced by an equivalent capacitive element 540 in FIG. 5C. After this replacement, the $k^{th}$ conductor is eliminated from the capacitive network, and there is now a second capacitive path 540 between the $i^{th}$ conductor and the virtual conductor 510. 540 represents a change (an increase) between the $i^{th}$ conductor and the virtual conductor 510.

FIG. 5C depicts the results of eliminating the $k^{th}$ conductor and providing the new series capacitance value 540 for signal carrying wire i. In FIG. 5C, a resulting series capacitance total 540 is $\Delta C_{i,tot}^{(k)}$ computed according to:

$$\Delta C_{i,tot}^{(k)} = \frac{c_{ik} C_{k,tot,not\_i\_th}}{c_{ik} + C_{k,tot,not\_i\_th}} \quad (3)$$

where the superscript (k) denotes the elimination of $k^{th}$ conductor. Thus, by eliminating the $k^{th}$ conductor, e.g., FR1, the resulting computed $\Delta C_{i,tot}^{(k)}$ is distributed among the capacitance values for the subject $i^{th}$ conductor and reduces the netlist specification as this wire is removed from the generated netlist. The resulting change in capacitance attributed to the $k^{th}$ conductor is added to the capacitance of the signal carrying wire C.

FIG. 5D depicts the further method steps at the current iteration (eliminating $k^{th}$ conductor), including restoring the "large" conductor of FIG. 5C as the original (N-2) unconnected conductors and also partitioning the $\Delta C_{i,tok(k)}$ between the $i^{th}$ conductor and each of the rest (N-2) conductors. Allocating the $\Delta C_{i,tok(k)}$ includes using the weight of each component $c_{jk}$ within $C_{k,tot,not\_i\_th}$, the partitioned weight computed according to:

$$\Delta c_{ij}^{(k)} = \frac{c_{kj}}{C_{k,tot,not\_i\_th}} \Delta C_{i,tot}^{(k)} \quad (4)$$

-continued where $i = 1, \ldots, N, i \neq k, j = i+1, \ldots, N, j \neq k$.

After eliminating the $k^{th}$ conductor, the new capacitive value for the conductor i under consideration is related to the capacitance $c_{ij}$ before the elimination step through this relation:

$$c_{ji}^{(k)} = c_{ij}^{(k)} = c_{ij} + c_{ij}^{(k)} \quad (5)$$

Thus, as shown in FIG. 5D, for the signal wire i, the new $c_{i,up}$ capacitance value $c_{i1}$ (where j=1) is increased and includes a partitioned capacitive component $\Delta c_{i1}^{(k)}$, new increased $c_{i,down}$ capacitance value $c_{i2}$ (where j=2) includes partitioned capacitive component $\Delta c_{i2}^{(k)}$, new increased $\Delta c_{i,bottom}$ capacitance value $c_{i3}$ (where j=3) includes increased partitioned capacitive component $\Delta c_{i3}^{(k)}$, and new $c_{i,top}$ capacitance value $c_{i4}$ (where j=4) includes additional partitioned capacitive component $\Delta c_{i4}^{(4)}$. The new coupling capacitance between signal carrying wire i and the next floating wire (conductor n) on the right-hand side is $$c_{i,n} + \Delta c_{i,n}^{(k)}$$

attributable to the eliminating of the first floating wire conductor k (e.g., FR1).

Returning to 675, FIG. 6B, the steps run at 670, FIG. 6B and depicted in FIGS. 5A-5D for removing the floating conductor, are repeated for each floating conductor on the right-hand side of the central signal carrying wire i. Thus, as shown in FIG. 5D, after eliminating a first floating wire (e.g., the $k^{th}$ conductor) from the capacitance network, there now remains a new capacitance network with (N−1) conductors, having the new capacitance components:

$$c_{ij}^{(k)}, i=1, \ldots, N, j=i+1, \ldots, N, i \neq k, j \neq k.$$

Then, the parasitic capacitance extraction method eliminates the $2^{nd}$ floating conductor (e.g., the $m^{th}$ conductor, m≠k) from the capacitance network starting with (N−1) conductors. Similar steps are performed such as illustrated with respect to FIGS. 5A-5D for the first floating conductor resulting in computing the following new capacitances for the subject signal carrying wire i:

$$c_{ij}^{(k,m)} = c_{ji}^{(k,m)}, i=1, \ldots, N, j=i+1, \ldots, N, i \neq k, j \neq k, i \neq m, j \neq m.$$

Next, in subsequent steps, the method eliminates the 3rd, 4th, . . . , floating conductors until all floating conductors are eliminated from the capacitance network.

Figure 7A:
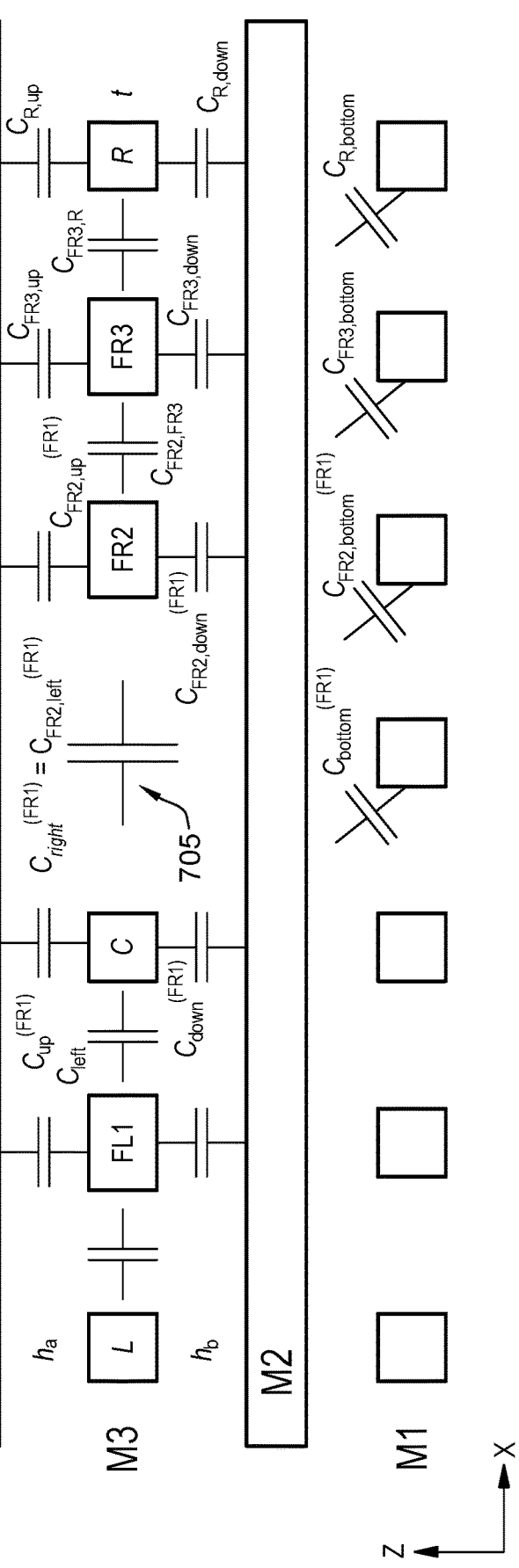
FIG. 7A shows a resulting design circuit representation for the example circuit design of FIG. 2 after the 1st float wire on the right-hand is eliminated as a result of the methods herein.

FIG. 7A shows a resulting design circuit representation 700 for the example circuit design of FIG. 2 after the 1st float wire on the right-hand is eliminated as a result of the methods shown and described with respect to FIGS. 5A-5D.

As shown in FIG. 7A, when both upper wires (M4) and lower wires (M2) are present, the original coupling capacitance between any two non-adjacent wires (e.g., FL1 to FR1, C to FR2) is almost zero. In this case, only the capacitance value change to the central wire C (4 of 6 components) and to the wire FR2 (4 of 6 components) and a new coupling capacitance 705 between wire C and wire FR2 needs to be updated after eliminating the floating wire FR1. When eliminating the first conductor (floating wire FR1), as shown in FIG. 7A, the four new capacitive components would be $c_{top}^{(FR1)}$ (corresponding to component $c_{top}$ for subject conductor i), $c_{up}^{(FR1)}$ (corresponding to component $c_{up}$ for subject conductor i), $c_{down}^{(FR1)}$ (corresponding to component $c_{down}$ for subject conductor i), and $c_{bottom}^{(FR1)}$ (corresponding to component $c_{bottom}$ for subject conductor i). As capacitance components $c_{right}^{(FR1)}$ and $c_{FR2,left}^{(FR1)}$ refer to a same capacitance element 705, namely, capacitance update of $c_{right}^{(FR1)} = c_{FR2,left}^{(FR1)}$.

Figure 7B:
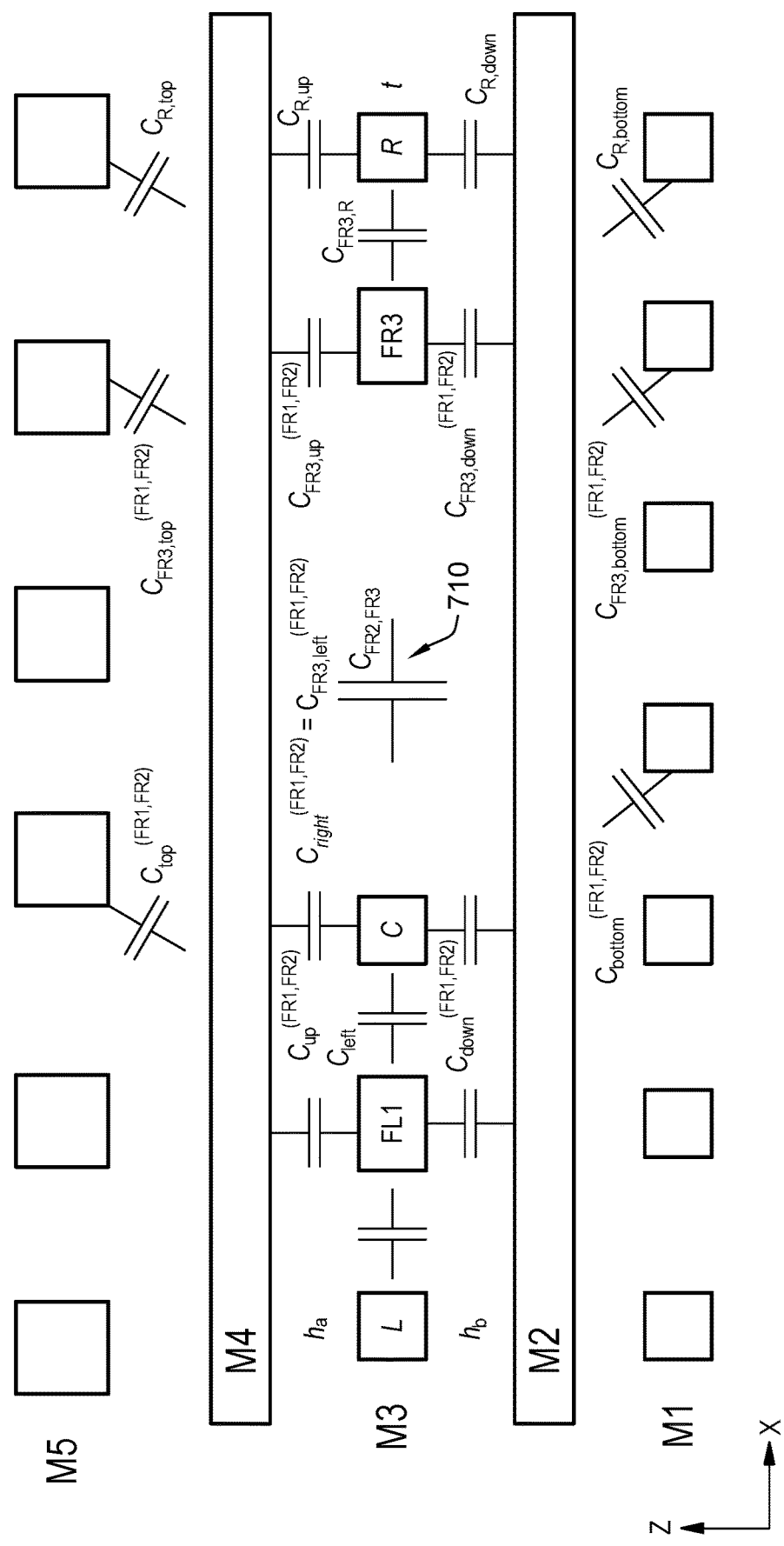
FIG. 7B shows a resulting design circuit representation for the example circuit design of FIG. 2 after the $2^{nd}$ float wire on the right-hand side (RHS) is eliminated as a result of the methods herein.

Similarly, as a result of eliminating the next conductor (floating wire FR2) using the steps of FIGS. 5A-5D, as shown in FIG. 7B, only the capacitance value change to the central wire C (4 of 6 components) and to the wire FR3 (4 of 6 components) and a new coupling capacitance 710 between the central wire C and wire FR3 after eliminating the floating wire FR2 need to be updated. The four new capacitive components would be $c_{top}^{(FR1,FR2)}$ (corresponding to component $c_{top}$ for subject conductor i), $c_{up}^{(FR1,FR2)}$ (corresponding to component $c_{up}$ for subject conductor i), $c_{down}^{(FR1,FR2)}$ (corresponding to component $c_{down}$ for subject conductor i), and $c_{bottom}^{(FR1,FR2)}$ (corresponding to component $c_{bottom}$ for subject conductor i). As the capacitance components $c_{right}^{(FR1,FR2)}$ and $c_{FR3,left}^{(FR1,FR2)}$ refer to a same capacitive element 710, the capacitance update $c_{right}^{(FR1,FR2)} = c_{FR3,left}^{(FR1,FR2)}$.

Figure 7C:
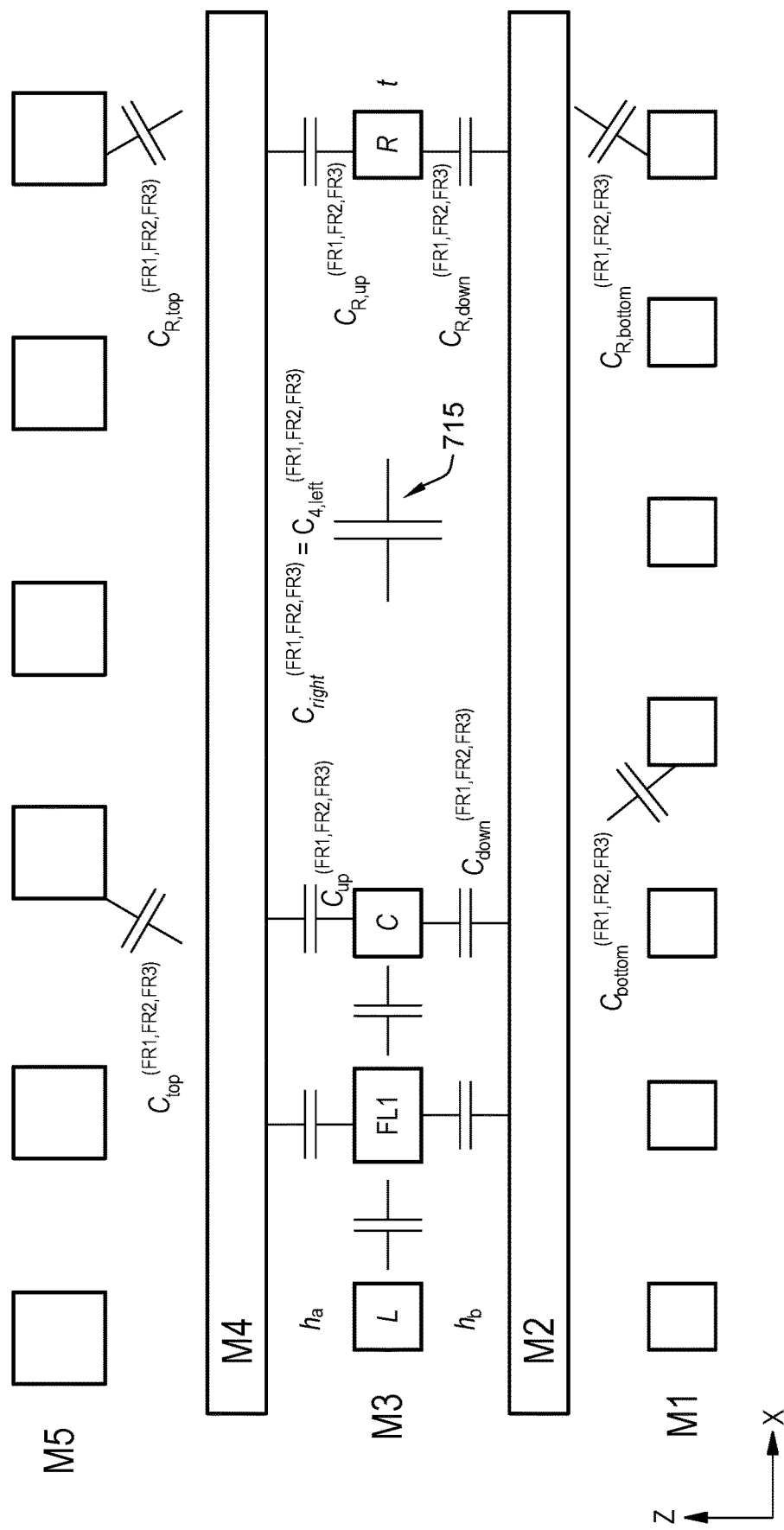
FIG. 7C shows a resulting design circuit representation for the example circuit design of FIG. 2 after the $3^{rd}$ float wire on the RHS is eliminated as a result of the methods herein.

Similarly, as a result of eliminating the next conductor (floating wire FR3), as shown in FIG. 7C, only the capacitance change to the central wire C (4 of 6 components) and to the wire R (4 of 6 components) and a new coupling capacitance 715 between wire C and wire R need to be calculated. The four new capacitive components would be $c_{top}^{(FR1,FR2,FR3)}$ (corresponding to component $c_{top}$ for subject conductor i), $c_{up}^{(FR1,FR2,FR3)}$ (corresponding to component $c_{up}$ for subject conductor i), $c_{down}^{(FR1,FR2,FR3)}$ (corresponding to component $c_{down}$ for subject conductor i), and $c_{bottom}^{(FR1,FR2,FR3)}$ (corresponding to component $c_{bottom}$ for subject conductor i). Similarly, capacitance components $c_{right}^{(FR1,FR2,FR3)}$ and $c_{4,left}^{(FR1,FR2,FR3)}$ refer to a same capacitance element 715. In other words, $c_{right}^{(FR1,FR2,FR3)} = c_{4,left}^{(FR1,FR2,FR3)}$.

The new coupling capacitance 715 between wire C and nearest right-hand side signal carrying wire R, i.e., capacitance $c_{right}^{(FR1,FR2,FR3)}$ is outputted and is used to populate the reduced netlist.

Returning to FIG. 6B, after step 650, in succession to or in parallel with processing steps 653, 656, 670, 675 for eliminating floating wires on the right-hand side of central wire C, similar method steps are performed for eliminating floating wires on the left-hand side of central wire C.

That is, at 663, for floating wires on the left-hand side, a determination is made as to (i) whether $N_{float\_left} > N_{float\_max}$ (e.g., 10), (ii) whether $w_{sig} = w_{float\_left1} = w_{float\_left2} = \cdots = w_{float\_left\_Nfloat\_max}$, and (iii) whether $s_{float\_left1} = s_{float\_left2} = \cdots = s_{float\_left\_Nfloat\_max}$, i.e., the same floating wire thicknesses and same space pattern. If all these three conditions are met, or resolves to true, then the process continues at 850 to compute regular "LHS isolated" wire capacitance parameters areas as will be further described herein below with respect to FIG. 8. Otherwise, if any of these conditions is not met, then the process proceeds to 666, FIG. 6B.

At step 666, computer-implemented steps perform treating each floating wire on the left-hand side as contacted (i.e., connected to a circuit or net and is signal carrying). Then, using the capacitance modeler module or capacitance lookup table, the method computes the set of six capacitance components ($c_j$, j=up, down, bottom, top, left, right) for each of the floating wires, e.g., FL1 in the example.

Continuing to 680, FIG. 6B, the method determines whether the floating wire on the left-side is floating, and if it is floating, then the method removes it from the capacitance network and calculates a new capacitance for the signal carrying central wire C in the manner as set forth at step 670 and in FIGS. 5A-5D. In the example circuit design of FIG. 2, a capacitance value $c_{left}^{(FL1)}$ is computed where $c_{left}^{(FL1)} = c_{L,right}^{(FL1)}$. This parasitic capacitance value $c_{left}^{(FL1)}$ may then be outputted.

The process proceeds to 690, FIG. 6B, after all (SADP) floating wires are removed from the capacitance network after performing steps 675, 685. That is, the capacitance components $c_j$ (j=up, down, top, and bottom, etc.) for L, R, C conductors now are final capacitance values, including the coupling capacitances between the central wire and the left-hand side contacted wire L ($c_{left}$>0) and the coupling capacitance between the central wire and the right-hand side contacted wire R ($c_{right}$>0) which may be used for subsequent circuit design (e.g., SPICE) simulations. Final outputted SPICE netlist is reduced in size, since the floating conductors FR1, FR2, FR3, and FL1 are not included in the resulting SPICE netlist. However, the impact of those removed wires FR1, FR2, FR3, and FL1 are included in the values of outputted capacitance.

In one embodiment, for SADP wires (e.g., multiple parallel long wires in a BEOL metal level using the SADP process), to calculate the capacitance of a particular wire, then all rounds for eliminating floating wires (i.e., eliminating all floating wires around that particular wire) are performed however, within each round, only two sub-rounds are performed (one sub-round for each of two adjacent wires on both sides of the to-be-eliminated floating wire).

Thus, returning to FIG. 6B, step 653, if it is determined that the (i) $N_{float\_right} > N_{float\_max}$, (ii) $w_{sig} = w_{float\_right1} = w_{float\_right2} = \cdots = w_{float\_right\_Nfloat\_max}$, and (iii) $s_{float\_right1} = s_{float\_right2} = \cdots = s_{float\_right\_Nfloat\_max}$, indicating the same floating wire thicknesses and same space pattern, all resolve true, then the process continues at 800 to compute regular "RHS isolated" wire capacitance parameters.

Figure 8:
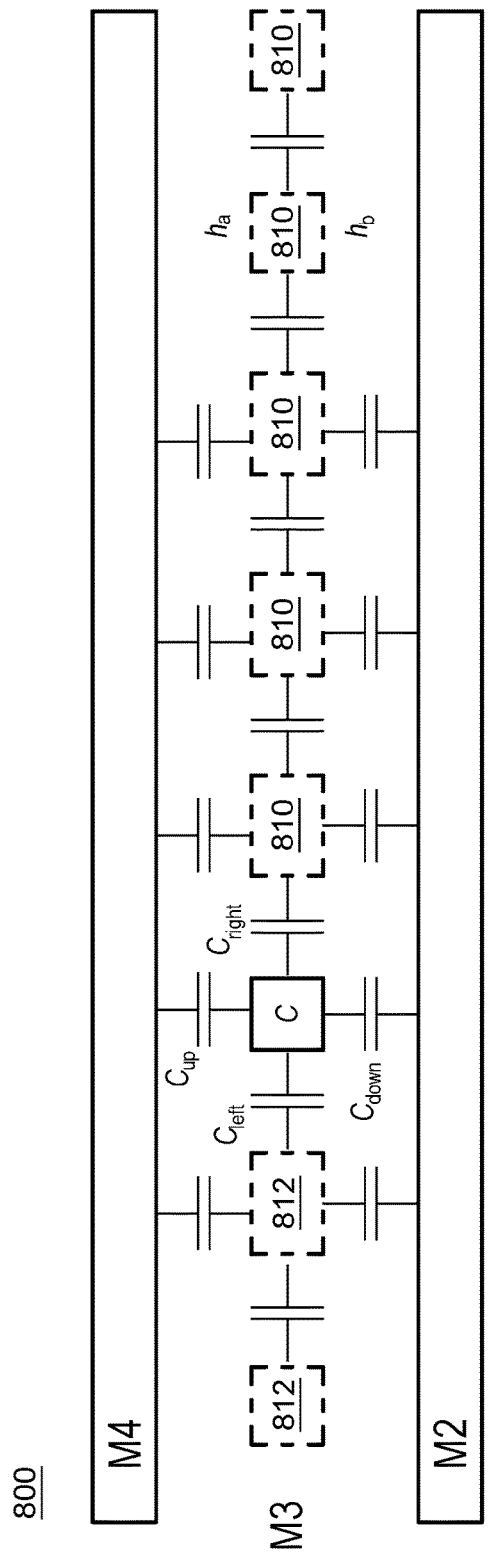
FIG. 8 shows an example circuit design layout where a contacted wire (C) is fully "isolated" (i.e., all wires on its left-hand side are floating and also all wires on its right-hand side are floating)

FIG. 8 shows an example circuit design layout 800 corresponding to the RHS fully isolated capacitive network embodiment. In FIG. 8, three metal levels M2-M4 are depicted with level M3 including a fully "isolated" SADP wire C adjacent a group of SADP floating wires 810 all having a same width and same space between. In this embodiment, the method includes eliminating all floating wires on the right-hand side by a single round.

The method first extracts $c_{left}$, $c_{right}$, $c_{top}$ $c_{up}$, $c_{down}$, $c_{top}$, and $c_{bottom}$ as before (step 650 in FIG. 6B) for the signal carrying wire C. The method then computes the effect of all floating wires on the right-hand side in a single round. The impact of removing all of the RHS floating wires 810 results in a capacitance change to the central wire C (4 of 6 components) as follows:

$$\Delta c_j^{(FR*)} = \frac{1}{2} c_j \left( \sqrt{1 + \frac{4c_{right}}{C_v}} - 1 \right), \quad (6)$$

$$\text{where } C_v = c_{up} + c_{down} + c_{top} + c_{bottom}, \quad (7)$$

$$j = \text{up, down, top, bottom.}$$

Superscript (FR*) represents after eliminating all floating wires on the right-hand side. The method adds $\Delta c_j^{(FR*)}$ to $c_j$, namely, $c_j^{(FR*)} = c_j + \Delta c_j^{(FR*)}$, j=up, down, top, bottom. Since there is no contacted wire on the right-hand side, one has that $c_{right}^{(FR*)} = 0$.

In the regular LHS isolated case, all floating wires on the left-hand side of the signal carrying wire C are similarly eliminated from the netlist in a single round.

The method first extracts $c_{left}$, $c_{right}$, $c_{up}$, $c_{down}$, $c_{top}$ and $c_{bottom}$ as before (650 in FIG. 6B) for the signal carrying wire C. The method then computes the effect of all floating wires on the left-hand side in a single round. In the regular LHS isolated case, the impact of removing all of the LHS floating wires 810 and 812 results in a capacitance change to the central wire C (4 of 6 components) as follows:

$$\Delta c_j^{(FR*)} = \frac{1}{2} c_j \left( \sqrt{1 + \frac{4c_{left}}{C_v}} - 1 \right), \quad (8)$$

where j=up, down, top, bottom, and $C_v$ is given in Eq. (7).

Superscript (FL*) represents after eliminating all floating wires on the left-hand side. The method adds $\Delta c_j^{(FL*)}$ to $c_j$, namely, $c_j^{(FL*)} = c + \Delta c_j^{(FL*)}$, j=up, down, top, bottom. Since there is no contacted wire on the left-hand side, it is concluded that $c_{left}^{(FL*)} = 0$.

A short summary: (i) When the signal C is regular "fully isolated" (see FIG. 8), $c_j^{(final)} = c_j + \Delta c_j^{(FL*)} + \Delta c_j^{(FR*)}$, j=up, down, top, bottom, and $c_{left}^{(final)} = c_{right}^{(final)} = 0$.

(ii) When the signal wire C is regular "RHS isolated" and there is no floating wire on its left-hand side (see FIG. 9), $c_j^{(final)} = c_j + \Delta c_j^{(FR*)}$, j=up, down, top, bottom, $c_{left}^{(final)} = c_{left}$, and $c_{right}^{(final)} = 0$.

(iii) When the signal wire C is regular "LHS isolated" and there is no floating wire on its right-hand side, $c_j^{(final)} = c_j + \Delta c_j^{(FL*)}$, j=up, down, top, bottom, $c_{left}^{(final)} = 0$, and $c_{right}^{(final)} = c_{right}$.

There are other cases, for example, (iv) the signal wire C is regular "LHS isolated" and $1 \leq N_{float\_right} \leq N_{float\_max}$, or (v) the signal wire C is regular "RHS isolated" and $1 \leq N_{float\_left} \leq N_{float\_max}$. The final capacitance values in these cases are obtained according the method described in FIG. 6 and detailed steps described above.

Figure 9:
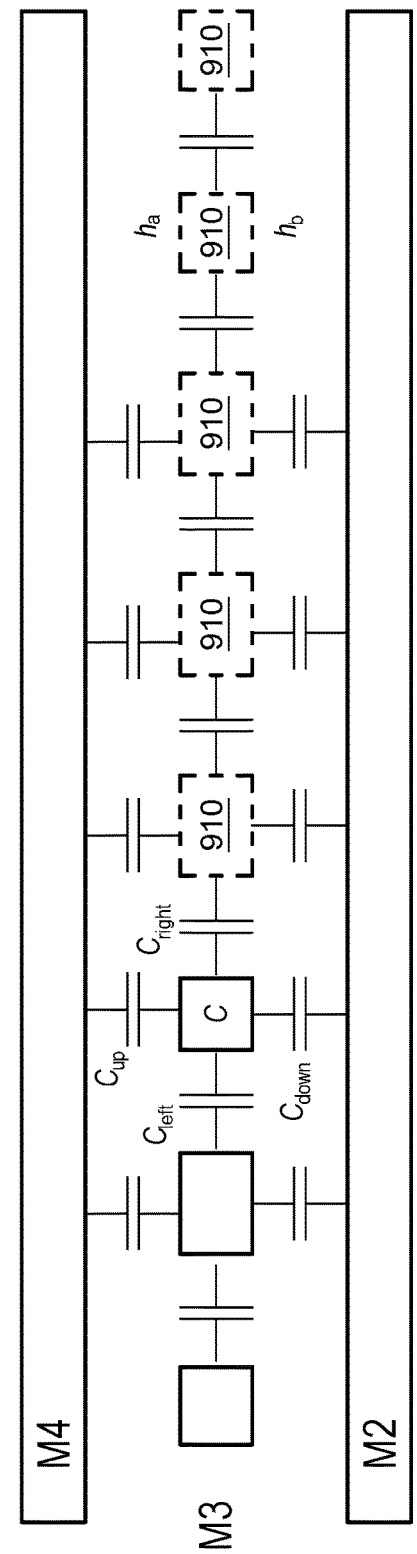
FIG. 9 shows an example circuit design layout where a contacted wire (C) is "semi-isolated" (i.e., all wires on its right-hand side are floating)

FIG. 9 shows an example circuit design layout 900 corresponding to the RHS "semi-isolated" capacitive network embodiment. In FIG. 9, three metal levels M2-M4 are depicted with level M3 including a semi-"isolated" SADP wire C adjacent a connected SADP wire R of equal thickness. To the right side of SADP metal wire T is group of SADP floating wires 910 all having a same width and same space between. In this embodiment, the wire R may be made as being contacted to "floating" and it is eliminated from the capacitance network resulting in an increase in the "vertical" capacitance component $C_v$ for the signal carrying wire C according to:

That is, the central signal carrying wire C in the fully isolated circuit design of FIG. 8 and its right-hand side wire R in the semi-isolated circuit design of FIG. 9 have the same capacitance components. This is also true after all floating wires are eliminated from each one's capacitance network.

The methods described herein may be used in a wire model within a SPICE model set for an advanced semiconductor technology where SADP process is used, however, may also be implemented in any PEX tool such as an layout extraction tool.

The new instance parameters that are generated to describe the number and dimensions of floating wires may then be used in a wire model or extracted netlist for use in the SPICE simulator 190.

When used in the PEX tool 180, the PEX tool requires a designer to specify which long (SADP) wires are floating. However, in the resulting extracted netlist, the specified long floating wire is eliminated from the netlist.

Given the additions of new extracted parasitic capacitance resulting from eliminating floating wires formed by an SADP process, the PEX tool 180 is updated to provide designers with accurate capacitance in the extracted netlist.

Subsequently, the information including the new extracted parasitic capacitance resulting from eliminating floating wires formed by an SADP process is used in the manufacturing of the integrated circuit.

Figure 11:
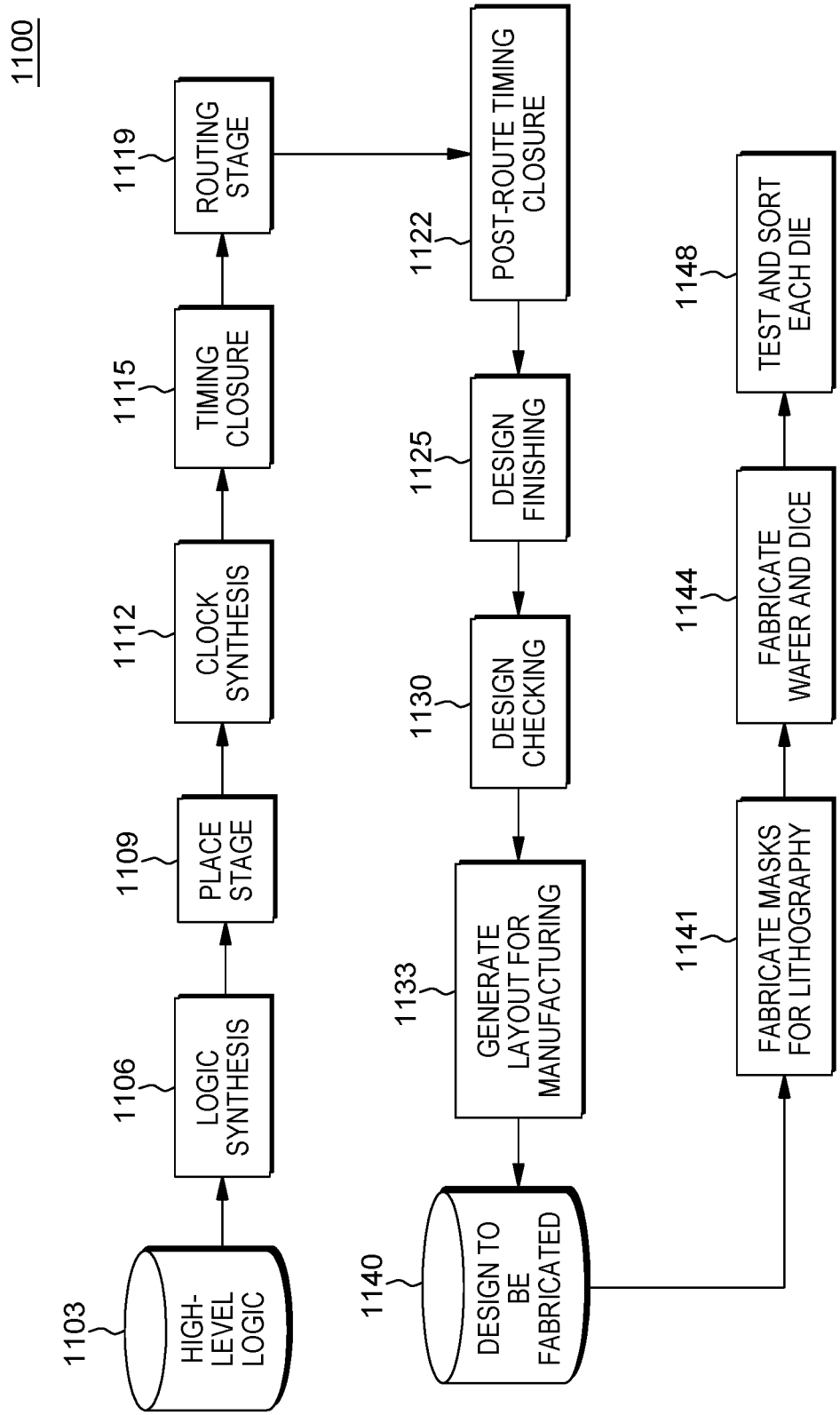
FIG. 11 illustrates an embodiment of a high-level electronic design automation (EDA) tool flow for use in accordance with the present invention.

FIG. 11 illustrates an embodiment of a high-level electronic design automation (EDA) tool flow 1100 for use in accordance with the embodiments of the present invention. In an example embodiment, an EDA tool flow is responsible for creating an optimized microprocessor design to be manufactured. A designer starts with a high-level logic description of the circuit (e.g. VHDL or Verilog) as input 1103. The logic synthesis tool 1106 compiles the logic, and optimizes it without any sense of its physical representation, and with estimated timing information. The placement tool at 1109 takes the logical description and places each component, looking to minimize congestion in each area of the design. The clock synthesis tool 1112 optimizes the clock tree network by cloning/balancing/buffering the latches or registers. The timing closure step 1115 performs a number of optimizations on the design, including buffering, wire tuning, and circuit repowering; its goal is to produce a design which is routable, without timing violations, and without excess power consumption. At this timing closure step, there can be performed a timing analysis using a reduced network of wire capacitance involving floating metal wires in SADP metal levels. The routing stage 1119 takes the placed/ optimized design, and determines how to create wires to connect all of the components, without causing manufacturing violations. Post-route timing closure 1122 performs another set of optimizations to resolve any violations that are remaining after the routing. At this post-route timing closure step, there can also be performed a timing analysis using a reduced network of wire capacitance involving floating metal wires in SADP metal levels. For example, a simulation may be performed to determine a performance delay, a noise coupling, and/or a voltage drop analysis involving a selected target metal wire of the SADP wire layer. Design finishing 1125 then adds extra metal shapes in non-SADP metal levels to the layout, to conform with manufacturing requirements. The design checking steps 1130 analyze whether the design is violating any requirements such as manufacturing, timing, power, electro-migration or noise. When the design is clean, the final step at 1133 is to generate a layout for the physical design 1140, representing all the shapes to be fabricated. Once the physical design data is obtained, the multi-level integrated circuit can be fabricated based on said optimized multi-level IC design layout according to known semiconductor manufacturing processes. Generally, a wafer with multiple copies of the final design is fabricated and cut (i.e., diced) such that each die is one copy of the integrated circuit. At block 1141, the processes include fabricating masks for lithography based on the finalized physical layout. At block 1144, fabricating the wafer includes using the masks to perform photolithography and etching. Once the wafer is diced, testing and sorting each die is performed at 1148 to filter out any faulty die.

Figure 10:
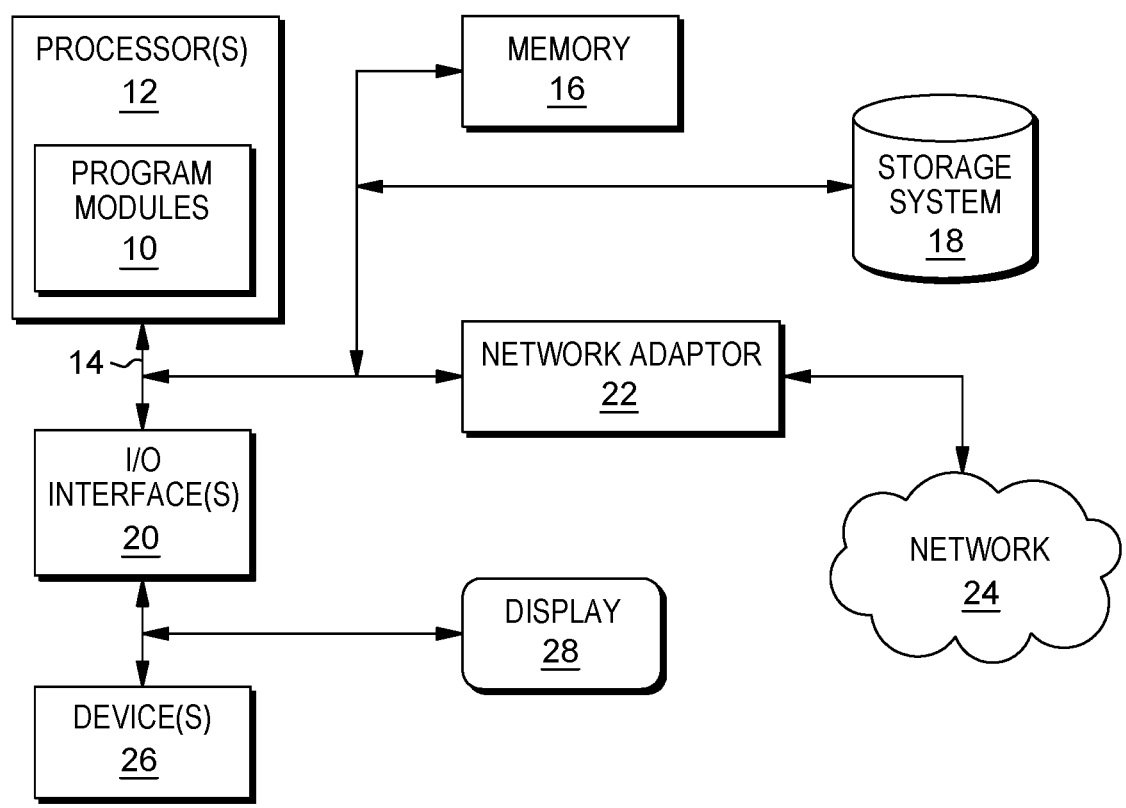
FIG. 10 illustrates an example computing system in accordance with the present invention that provides the parasitic capacitance extraction methods for semiconductor SADP metal wires.

FIG. 10 illustrates an example computing system in accordance with the present invention that provides the parasitic capacitance extraction methods for semiconductor SADP metal wires. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 6A-6B.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via input/output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that, although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for manufacturing a multi-level integrated circuit (IC), the method comprising:
   accessing, using a computer system, a multi-level integrated circuit design layout;
   extracting, using the computing system, a parasitic capacitance of structures in said multi-level IC design layout, said structures including a SADP metal wire level having a plurality of metal wires to be manufactured according to a self-aligned double-patterning (SADP) manufacturing process, said SADP metal wire level situated above one or more lower layers of conductive structures and situated below one or more upper layers of conductive structures, said extracting resulting in a capacitive network of wires in said IC design layout;
   selecting a target metal wire from said plurality of metal wires at said SADP metal wire level, said selected target metal wire having one or more parallel situated floating metal wires in line on at least one side thereof, said capacitive network comprising: capacitance component values for said target metal wire at said SADP metal wire level, capacitance component values of said floating metal wires, a node of said selected target metal wire, and nodes of the floating metal wires;
   successively eliminating from said capacitive network, using one or more processors of said computing system, each said one or more parallel situated floating metal wires adjacent in line on one side of said target metal wire at said SADP metal wire level until a second target current carrying metal wire is encountered and successively eliminating from the capacitive network each said one or more parallel situated floating metal wires adjacent in line on another side of said target metal wire at said SADP metal wire level until a third target current carrying metal wire is encountered to reduce the size of the capacitive network, and
   for each floating wire successively eliminated adjacent on each said one side and said another side of said target metal wire, obtaining updated capacitive components for said target metal wire;
   simulating, using a circuit simulator run at said computer system, a circuit performance involving the selected target metal wire of the capacitive network; and
   repeating, at the computing system, from said IC design layout, cycles of parasitic capacitance extracting, capacitance-network size reducing, and said simulating to optimize the multi-level IC design layout.

2. The computer-implemented method of claim 1, further comprising:
   obtaining a final updated coupling capacitive component between said target metal wire and the second target current carrying metal wire when all adjacent floating metal wires on said one side are eliminated and a final updated coupling capacitive component between said target metal wire and the third target current carrying metal wire when all adjacent floating metal wires on said another side are eliminated.

3. The computer-implemented method of claim 2, wherein said obtaining updated capacitive components for said target metal wire comprises:
   at each successive eliminating of an adjacent floating metal wire on said one side of said target metal wire, computing updated capacitive components for both said target metal wire on one side of the floating wire and for a next adjacent metal wire on the other side of the floating wire being eliminated including an updated coupling capacitance between said target metal wire and the next adjacent floating metal wire on the other side of the floating wire being eliminated; and
   at each successive eliminating of an adjacent floating metal wire on said another side of said target metal wire, computing updated capacitive components for both said target metal wire on one side of the floating wire and for a next adjacent metal wire on the other side of the floating wire being eliminated including an updated coupling capacitance between said target metal wire and the next floating metal wire on the other side of the floating metal wire being eliminated.

4. The computer-implemented method of claim 3, wherein prior to said eliminating of an adjacent floating metal wire on either side of the target metal wire, the method further comprising:
   using one or more processors of said computing system to compute capacitance components for said target metal wire, said computed capacitance components including a coupling capacitance between said target metal wire and conductive structures at each said one or more upper layers, a coupling capacitance between said target metal wire and conductive structures at each said one or more lower layers, a coupling capacitance between said target metal wire and a first floating metal wire on the same layer adjacent said target metal wire on one side, and a coupling capacitance between said target metal wire and a first floating metal wire on the same layer adjacent said target metal wire on another side.

5. The computer-implemented method of claim 4, wherein said obtaining updated capacitive components for said target metal wire comprises:
   after each successive eliminating of a floating metal wire adjacent on said one side of said target metal wire, updating a coupling capacitance between said target metal wire and conductive structures at each said one or more upper layers, and a coupling capacitance between said target metal wire and conductive structures at each said one or more lower layers; and
   after each successive eliminating of a floating metal wire adjacent on said another side of said target metal wire, updating a coupling capacitance between said target metal wire and conductive structures at each said one or more upper layers, and a coupling capacitance between said target metal wire and conductive structures at each said one or more lower layers.

6. The computer-implemented method of claim 5, further comprising:
   generating, by said one or more processors, a netlist representation for said IC design that excludes all said floating metal wires on said one side of said target metal wire at said SADP metal wire level and excludes all said floating metal wires on said another side of said target metal wire.

7. The computer-implemented method as claimed in claim 6, further comprising:
   simulating, in an electronic design simulator, a performance of said IC circuit design, said simulator using said updated coupling capacitive component between said target metal wire and conductive structures at each said one or more upper layers, and conductive structures at said one or more lower layers, the final updated coupling capacitance between said target metal wire and second target current carrying metal wire on the same layer on said one side, and the final updated coupling capacitance between said target metal wire and said third target current carrying metal wire on the same layer on said another side.

8. The computer-implemented method as claimed in claim 2, wherein said updated capacitive components for said target metal wire includes one or more capacitance components attributable to said floating metal wire when treated as connected in said capacitive network prior to said eliminating, said method further comprising, for an adjacent floating metal wire in an SADP metal wire layer to be eliminated:
   computing capacitance components for the adjacent floating metal wire to be eliminated, a respective computed capacitance component for said adjacent floating metal wire representing a capacitance between said adjacent floating metal wire and a respective metal wire at each said upper layer conductive structures and lower layer conductive structures, said capacitance components for the adjacent floating metal wire excluding a coupling capacitance component between said target metal wire and the adjacent floating metal wire; and for an adjacent floating metal wire to be eliminated:
   computing a total capacitance for the adjacent floating metal wire as a merge of said capacitive components computed for the adjacent floating metal wire; and
   computing a change in total capacitance of said target metal wire as a function of said updated coupling capacitance components and said total capacitance for the adjacent floating metal wire.

9. The computer-implemented method as claimed in claim 8, wherein said obtaining updated capacitive components for said target metal wire including an updated coupling capacitance component further comprises, after an adjacent floating metal wire is eliminated:
   adding to each respective said capacitance component for said target metal wire a respective capacitance based on a weight of a respective capacitive component of said adjacent floating metal wire within said computed total capacitance for the adjacent floating wire structure.

10. The computer-implemented method as claimed in claim 8, wherein said computing a total capacitance for an adjacent floating metal wire in an SADP metal wire layer comprises:
    treating said conductors of said capacitive network of conductors other than said target metal wire and said adjacent floating wire to be eliminated as being connected in parallel, said merge of said capacitive components computed for the adjacent floating metal wire to be eliminated comprising a summation of individual capacitive components attributed to said adjacent floating wire when treated as connected in said capacitive network minus said updated coupling capacitance component, wherein said change in total capacitance of said target wire structure is computed as a series connection between said summation of individual capacitive components and said updated coupling capacitance component.

11. A computer program product for manufacturing a multi-level integrated circuit (IC), the computer program product comprising
    a non-transitory computer readable storage medium having program instructions embodied therewith, the program instructions executable by a computer to cause the computer to perform a method comprising:
    analyzing, using a computing system, a multi-level integrated circuit design layout;
    extracting, using the computing system, a parasitic capacitance of structures in said multi-level IC design layout, said structures including a SADP metal wire level having a plurality of metal wires to be manufactured according to a self-aligned double-patterning (SADP) manufacturing process, said SADP metal wire level situated above one or more lower layers of conductive structures and situated below one or more upper layers of conductive structures, said extracting resulting in a capacitive network of wires in said IC design layout;
    selecting a target metal wire from said plurality of metal wires at said wire level, said selected target metal wire having one or more parallel situated floating metal wires in line on at least one side thereof, said capacitive network comprising: capacitance component values for said target metal wire at said SADP metal wire level, capacitance component values of said floating metal wires, a node of said selected target metal wire, and nodes of the floating metal wires;
    successively eliminating from said capacitive network, using one or more processors of said computing system, each said one or more parallel situated floating metal wires adjacent in line on one side of said target metal wire at said SADP metal wire level until a second target current carrying metal wire is encountered and successively eliminating from the capacitive network each said one or more parallel situated floating metal wires adjacent in line on another side of said target metal wire at said SADP metal wire level until a third target current carrying metal wire is encountered to reduce the size of the capacitive network, and for each floating wire eliminated adjacent on each said one side and said another side of said target metal wire, obtaining updated capacitive components for said target metal wire;

simulating, using a circuit simulator run at said computing system, a circuit performance involving the selected target metal wire of the capacitive network; and repeating, at the computing system, from said IC design layout, cycles of parasitic capacitance extracting, capacitance-network size reduction, and said simulating to optimize the multi-level IC design layout.

12. The computer program product of claim 11, further comprising:

obtaining a final updated coupling capacitive component between said target metal wire and the second target current carrying metal wire when all adjacent floating metal wires on said one side are eliminated and a final updated coupling capacitive component between said target metal wire and the third target current carrying metal wire when all adjacent floating metal wires on said another side are eliminated.

13. The computer program product of claim 12, wherein said obtaining updated capacitive components for said target metal wire comprises:

at each successive eliminating of an adjacent floating metal wire on said one side of said target metal wire, computing updated capacitive components for both said target metal wire on one side of the floating wire and for a next adjacent metal wire on the other side of the floating wire being eliminated including an updated coupling capacitance between said target metal wire and the next adjacent floating metal wire on the other side of the floating wire being eliminated; and at each successive eliminating of an adjacent floating metal wire on said another side of said target metal wire, computing updated capacitive components for both said target metal wire on one side of the floating wire and for a next adjacent metal wire on the other side of the floating wire being eliminated including an updated coupling capacitance between said target metal wire and the next floating metal wire on the other side of the floating metal wire being eliminated.

14. The computer program product of claim 13, wherein prior to said eliminating of an adjacent floating metal wire on either side of the target metal wire, the method further comprising:

using one or more processors of said computing system to compute capacitance components for said target metal wire, said computed capacitance components including a coupling capacitance between said target metal wire and conductive structures at each said one or more upper layers, a coupling capacitance between said target metal wire and conductive structures at each said one or more lower layers, a coupling capacitance between said target metal wire and a first floating metal wire on the same layer adjacent said target metal wire on one side, and a coupling capacitance between said target metal wire and a first floating metal wire on the same layer adjacent said target metal wire on another side.

15. The computer program product of claim 14, wherein said obtaining updated capacitive components for said target metal wire comprises:

after each successive eliminating of a floating metal wire adjacent on said one side of said target metal wire, updating a coupling capacitance between said target metal wire and conductive structures at each said one or more upper layers, and a coupling capacitance between said target metal wire and conductive structures at each said one or more lower layers; and after each successive eliminating of a floating metal wire adjacent on said another side of said target metal wire, updating a coupling capacitance between said target metal wire and conductive structures at each said one or more upper layers, and a coupling capacitance between said target metal wire and conductive structures at each said one or more lower layers.

16. The computer program product of claim 15, further comprising:

generating, by said one or more processors, a netlist representation for said IC design that excludes all said floating metal wires on said one side of said target metal wire at said SADP metal wire level and excludes all said floating metal wires on said another side of said target metal wire.

17. The computer program product as claimed in claim 16, further comprising:

simulating, in an electronic design simulator, a performance of said IC circuit design, said simulator using said updated coupling capacitive component between said target metal wire and conductive structures at each said one or more upper layers, and conductive structures at said one or more lower layers, the final updated coupling capacitance between said target metal wire and second target current carrying metal wire on the same layer on said one side, and the final updated coupling capacitance between said target metal wire and said third target current carrying metal wire on the same layer on said another side.

18. The computer program product as claimed in claim 12, wherein said updated capacitive components for said target metal wire includes one or more capacitance components attributable to said floating metal wire when treated as connected in said capacitive network prior to said eliminating, said method further comprising, for an adjacent floating metal wire in an SADP metal wire layer to be eliminated:

computing capacitance components for the adjacent floating metal wire to be eliminated, a respective computed capacitance component for said adjacent floating metal wire representing a capacitance between said adjacent floating metal wire and a respective metal wire at each said upper layer conductive structures and lower layer conductive structures, said capacitance components for the adjacent floating metal wire excluding a coupling capacitance component between said target metal wire and the adjacent floating metal wire; and for an adjacent floating metal wire to be eliminated:

computing a total capacitance for the adjacent floating metal wire as a merge of said capacitive components computed for the adjacent floating metal wire; and computing a change in total capacitance of said target metal wire as a function of said updated coupling capacitance components and said total capacitance for the adjacent floating metal wire.

19. The computer program product as claimed in claim 18, wherein said obtaining updated capacitive components for said target metal wire including an updated coupling capacitance component further comprises, after an adjacent floating metal wire is eliminated:

adding to each respective said capacitance component for said target metal wire a respective capacitance based on a weight of a respective capacitive component of said adjacent floating metal wire within said computed total capacitance for the adjacent floating wire structure.

20. The computer program product as claimed in claim 18, wherein said computing a total capacitance for an adjacent floating metal wire in an SADP metal wire layer comprises:

treating said conductors of said capacitive network of conductors other than said target metal wire and said adjacent floating wire to be eliminated as being connected in parallel, said merge of said capacitive components computed for the adjacent floating metal wire to be eliminated comprising a summation of individual capacitive components attributed to said adjacent floating wire when treated as connected in said capacitive network minus said updated coupling capacitance component, wherein said change in total capacitance of said target wire structure is computed as a series connection between said summation of individual capacitive components and said updated coupling capacitance component.

* * * * *